(12) United States Patent
Matsubara et al.

(10) Patent No.: US 8,177,681 B2
(45) Date of Patent: May 15, 2012

(54) CONTROL DEVICE FOR VEHICULAR POWER TRANSMITTING APPARATUS

(75) Inventors: Tooru Matsubara, Toyota (JP); Atsushi Tabata, Okazaki (JP); Masakazu Kaifuku, Okazaki (JP)

(73) Assignees: Toyota Jidosha Kabushiki Kaisha, Toyota (JP); Aisin Aw Co., Ltd., Anjo (JP)

( * ) Notice: Subject to any disclaimer, the term of this patent is extended or adjusted under 35 U.S.C. 154(b) by 949 days.

(21) Appl. No.: 12/219,830

(22) Filed: Jul. 29, 2008

(65) Prior Publication Data

US 2009/0042691 A1 Feb. 12, 2009

(30) Foreign Application Priority Data

Aug. 7, 2007 (JP) ................................. 2007-205981

(51) Int. Cl.
*F16H 61/16* (2006.01)
(52) U.S. Cl. .............................. 477/3; 477/125; 477/126
(58) Field of Classification Search .............. 477/3, 125, 477/126
See application file for complete search history.

(56) References Cited

U.S. PATENT DOCUMENTS

| | | | | |
|---|---|---|---|---|
| 4,574,661 A | * | 3/1986 | Opperud et al. | ............... 477/126 |
| 5,259,272 A | * | 11/1993 | Yamamoto et al. | ............. 477/45 |
| 6,644,454 B2 | * | 11/2003 | Yamada et al. | ............ 192/219.1 |
| 2006/0006734 A1 | | 1/2006 | Tabata et al. | |
| 2007/0015627 A1 | * | 1/2007 | Hinami et al. | .................. 477/97 |
| 2008/0182710 A1 | * | 7/2008 | Shibata et al. | .................... 477/3 |
| 2009/0137360 A1 | | 5/2009 | Shibata et al. | |

FOREIGN PATENT DOCUMENTS

| | | |
|---|---|---|
| JP | A-01-150054 | 6/1989 |
| JP | B2-2808923 | 7/1998 |
| JP | A-2007-118722 | 5/2007 |
| WO | WO 2007/049678 A1 | 5/2007 |

OTHER PUBLICATIONS

Chinese Office Action dated Feb. 28, 2012 in Chinese Patent Application No. 200810144910.1 (with translation).

* cited by examiner

*Primary Examiner* — Sherry Estremsky
(74) *Attorney, Agent, or Firm* — Oliff & Berridge, PLC

(57) ABSTRACT

A control device for a vehicular power transmitting apparatus, having engaging devices including a one-way clutch, is disclosed which prevents a locked state of the one-way clutch from causing the occurrence of slippages of other engaging devices to avoid a drop in durability of the engaging device. To achieve this object, engaging a plurality of engaging devices in combined operations allows a plurality of gear positions to be established. A shifting mechanism (vehicular power transmitting apparatus) 10 is provided wherein at least one of the plural engaging devices includes a one-way clutch F1. The shifting mechanism switches a method of selecting a gear position at S3 depending on a shift position of a shift lever 52, determined at S1, and a vehicle running direction determined at S2.

15 Claims, 9 Drawing Sheets

| | C1 | C2 | B1 | B2 | B3 | B4 | F1 | F2 | SPEED RATIO | STEPPING RATIO |
|---|---|---|---|---|---|---|---|---|---|---|
| 1st | ○ | | | | (○) | | ○ | | 3.357 | 1.54 |
| 2nd | ○ | | | ○ | | (○) | | ○ | 2.180 | 1.53 |
| 3rd | ○ | ○ | | | | | | | 1.424 | 1.42 |
| 4th | ○ | ○ | | | | | | | 1.000 | SPREAD 3.36 |
| R | | ○ | | | | ○ | | | 3.209 | |
| N | | | | | | | | | | |

○ : ENGAGED  (○) : ENGAGED UPON ENGINE BRAKE

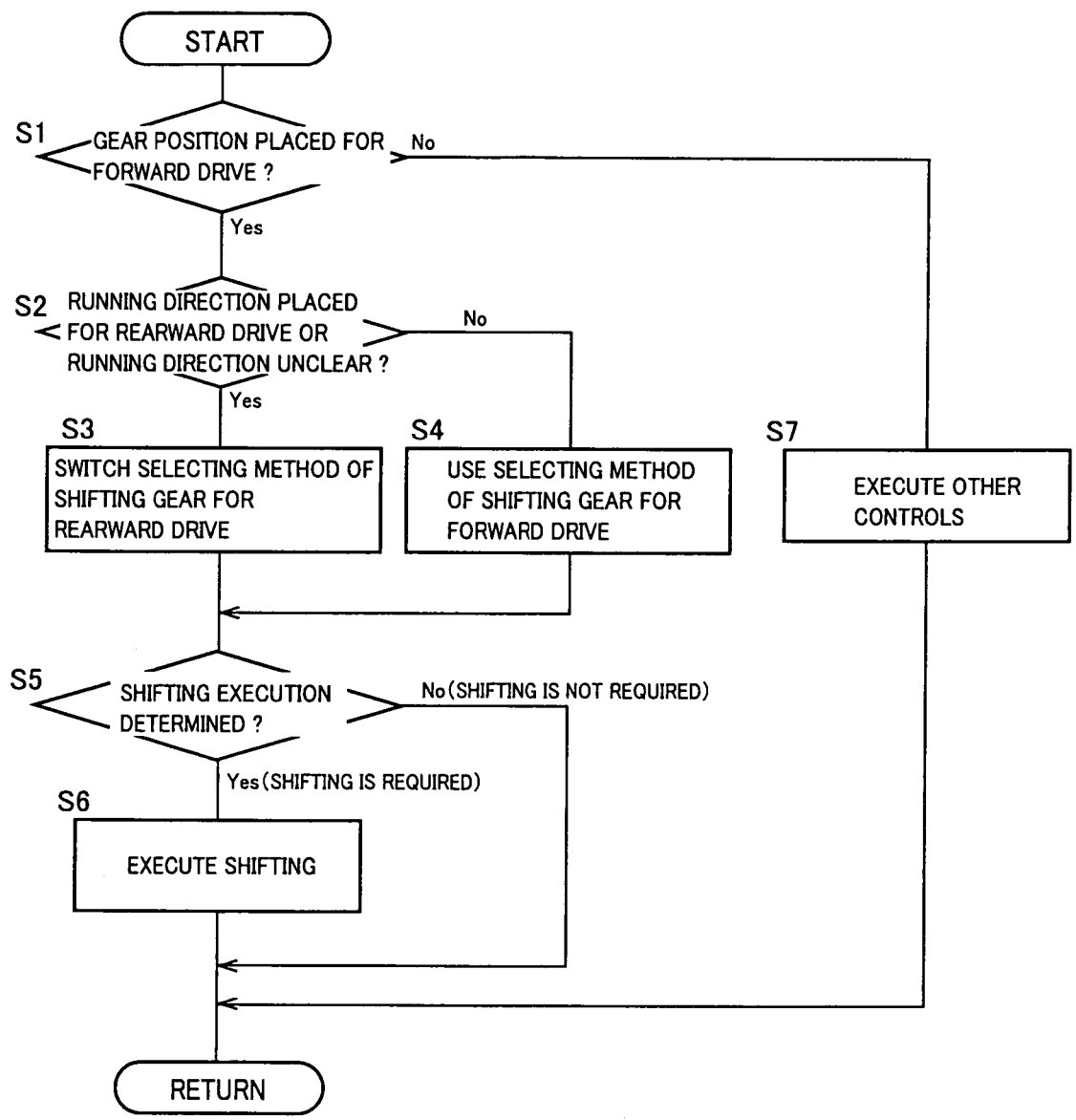

CONTROL DEVICE FOR VEHICULAR POWER TRANSMITTING APPARATUS

BACKGROUND OF THE INVENTION

1. Field of the Invention

This invention relates to control devices for vehicular power transmitting apparatus. More particularly, it relates to a technology of preventing slippages in engaging devices due to locked one-way clutch incorporated in a vehicular power transmitting apparatus composed of a plurality of engaging devices including the one-way clutch.

2. Description of the Related Art

With a vehicular power transmitting apparatus operable to select a plurality of speed ratios, a control device has heretofore been employed in the power transmitting apparatus. The control device switches a method of selecting speed ratios depending on a running condition of a vehicle. Such a control device of an automatic transmission is taught in, for instance, Patent Publication 1 (Japanese Patent No. 2808923). Patent Publication 1 discloses the automatic transmission, adapted to perform a shifting based on a shifting map for selecting an optimum gear position i.e. speed position or shifting position depending on a vehicle speed representing a running direction of the vehicle and a depressing stroke of an accelerator pedal, with altering the shifting map based on an intake air quantity of an internal combustion engine representing an operating state of the vehicle.

Here, the vehicle speed, used as the running condition of the vehicle, is obtained upon detecting a rotation speed of an output shaft or a drive shaft with use of a rotation speed sensor. However, it becomes often difficult to obtain information related to a rotational direction, i.e. a running direction of the vehicle when acquiring the rotation speed, delivered from such a sensor, merely as a pulse signal. Therefore, the vehicle running direction has not been taken into consideration when executing the shifting. Under a circumstance where, for instance, an automatic gear position for a forward drive is selected with the shifting being executed using a shifting map for a forward drive, the shifting may be executed based on the shifting map for the forward drive even when the vehicle runs rearward.

In such an event, the shifting is executed based on an absolute value of the vehicle speed. Therefore, even with the vehicle running rearward at a high speed, the shifting is executed into a gear position for the forward drive at the high speed when the shifting map for the forward drive is used.

Meanwhile, one-way clutch has been widely used in part of the engaging devices of the power transmitting apparatus. The one-way clutch is operative to transfer a rotation in one direction while freewheeling i.e. idly rotating in the other direction. With such one-way clutches in use, the one-way clutches can be automatically disengaged or engaged, in contrast to a structure in which a so-called clutch-to-clutch shifting is performed with disengaging one one-way clutch and concurrently engaging the other one-way clutch. Therefore, it may suffice to allow only one one-way clutch to be engaged or disengaged, enabling the shifting to be executed in a simplified sequence.

With the power transmitting apparatus incorporating such one-way clutches, there exists a gear position that is established on the premise of freewheeling i.e. idle rotation of the one-way clutch. If a vehicle runs rearward when the gear position is selected with the one-way clutch placed under the freewheeling state, the one-way clutch is caused to rotate in a direction opposite to an original rotational direction of the one-way clutch, i.e. a direction in which the one-way clutch rotates when the vehicle runs forward. This causes the one-way clutch to be locked, with accompanying occurrence of confliction (a slippage caused in the engaging device engaging under a weakened engaging force as a result of a tie-up effect) between the one-way clutch and the other engaging element, causing a drop in durability of the engaging device.

Especially, as a result of the gear position for the forward drive being selected, if the shifting is performed based on the shifting map for the forward drive even when the vehicle runs rearward, slippages may occur in the engaging devices. This is because the shifting is executed based on an absolute value of the vehicle speed with a resultant unintentional shift from the gear position with the one-way clutch freewheeling to another gear position with the one-way clutch being locked.

SUMMARY OF THE INVENTION

The present invention has been completed with the above views in mind and has an object to provide a control device for a vehicular power transmitting apparatus that is operative to switch a selecting method of a gear position depending on a selected shift position and a vehicle running direction for thereby precluding occurrence of a slippage in an engaging device.

For achieving the above object, in a first aspect of the invention, the vehicular power transmitting apparatus comprises a plurality of engaging devices to establish a plurality of gear positions in combination of engaging operations of the plurality of engaging devices, at least one of the engaging devices including a one-way clutch. The control device is operative to switch a gear position depending on a selected shift position or shift range and a vehicle running direction.

With such a structure, the vehicular power transmitting apparatus switches the gear positions depending on the selected shift position or shift range and the vehicle running direction. As a result, even if the same running condition, except for the shift position or the shift range and the vehicle running direction is present, a different gear position can be selected when a difference is present in the relationship with respect of the selected shift position or shift range and the vehicle running direction. This prevents a locked state of the one-way clutch from causing a slippage in the other engaging device, thereby precluding occurrence of a durability drop of the engaging device.

In a second aspect of the invention, the control device selects the gear position depending on a vehicle speed. With such a structure, since the gear position is selected depending on a vehicle speed, altering the vehicle speed for performing the shifting depending on the selected shift position and vehicle running direction can easily switch the selecting method of the gear position.

In a third aspect of the invention, the control device selects the gear position depending on the selected shift position or shift range. With such a structure, the gear position can be selected depending on the selected shift position or shift range. Thus, by altering the shift position or the shift range depending on the selected shift position or shift range and the vehicle running direction, the selecting method of the gear position can be easily switched. In addition, the gear position can be selected among a plurality of gear positions defined with the shift position or the shift range. This enables the gear position to be selected in an altered shift range established with a gear position causing no slippage in the other engaging device due to the locked state of the one-way clutch.

In a fourth aspect of the invention, the control device switches the gear position upon switching shifting lines. With such a structure, the gear position can be selected upon switching the shifting line determined in accordance with the selected shift position and the vehicle running direction, capable of easily switching the selecting method of the gear position.

In a fifth aspect of the invention, the control device switches the gear position upon altering an upper limit or a lower limit of a selectable gear position. With such a structure, the gear position can be selected upon altering the upper limit or the lower limit of the selectable gear position altered depending on the selected shift position and the vehicle running direction, capable of easily switching the selecting method of the gear position. Thus, the selecting method of the gear position can be easily switched.

In a sixth aspect of the invention, the control device determines the vehicle running direction upon detecting a rotational direction of an output shaft of the vehicular power transmitting apparatus or a member connected to the output shaft. With such a structure, the selecting method of the gear position is altered based on the vehicle running direction, determined upon detecting the rotational direction of the output shaft of the vehicular power transmitting apparatus, or the member connected to the output shaft, and the selected shift position.

In a seventh aspect of the invention, the vehicular power transmitting apparatus includes an electrically controlled differential portion operative to control a differential state between an input-shaft rotation speed and an output-shaft rotation speed upon controlling an operating state of an electric motor connected to a rotary element of a differential portion. With such a structure, even the vehicular power transmitting apparatus having the electrically controlled differential portion can prevent the locked state of the one-way clutch from causing a slippage of the other engaging device.

In an eighth aspect of the invention, the vehicular power transmitting apparatus includes a step-variable shifting portion and the electrically controlled differential portion both provided in a power transmitting path. With such a structure, even the vehicular power transmitting apparatus having the electrically controlled differential portion can prevent the locked state of the one-way clutch from causing a slippage of the other engaging device.

In a ninth aspect of the invention, the step-variable shifting portion of the vehicular power transmitting apparatus has a gear position, causing no slippages to occur in the engaging devices due to engagement of the one-way clutch, which is selected when the shift position or the shift range is in a forward drive position and the vehicle running direction is in a reverse drive direction or unclear. With such a structure, when the selected shift position lies in the forward drive position and the vehicle running direction lies in the reverse drive direction, a 1st-speed gear position is selected to establish a gear position achieved when engaging the brake connected to the one-way clutch of the step-variable transmission in parallel thereto. With the 1st-speed gear position being selected, the one-way clutch is caused to freewheel i.e. idly rotate during the rearward movement of the vehicle, thereby precluding the locked state of the one-way clutch from causing a slippage in the other engaging device.

In a tenth aspect of the invention, the electrically controlled differential portion is rendered operative as a continuously variable shifting mechanism upon controlling an operating state of an electric motor. With such a structure, the electrically controlled differential portion is rendered operative as the continuously controlled shifting mechanism. Thus, even if the vehicular power transmitting apparatus acts as a step-variable transmission, the locked state of the one-way clutch can be prevented from causing a slippage in the other engaging device.

BRIEF DESCRIPTION OF THE DRAWINGS

FIG. 11 is a flowchart illustrating a major part of control operations to be executed with the electronic control device shown in FIG. 4.

DETAILED DESCRIPTION OF THE PREFERRED EMBODIMENTS

Now, various embodiments according to the present invention will be described below in detail with reference to the accompanying drawings.

<Embodiment>

Figures 1, 2:
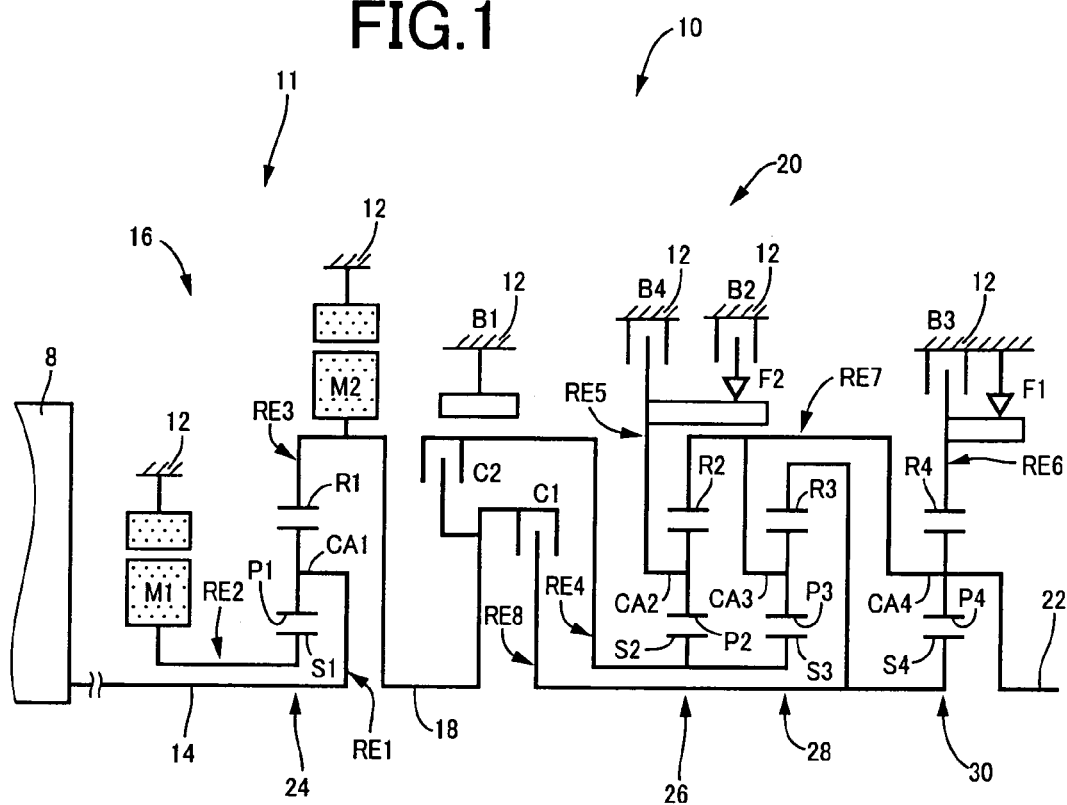
FIG. 1 is a skeleton diagram showing structure of a power transmitting apparatus of one embodiment according to which a control device of the present invention is applied.
FIG. 2 is a functional diagram illustrating relations between speed shifting positions established in an automatic shifting portion constructing a differential mechanism shown in FIG. 1, and combined operations of hydraulically operated frictional engaging devices for use therein.

FIG. 1 is a skeleton diagram for illustrating a transmission mechanism i.e., shifting mechanism 10 constituting a part of a drive system for a hybrid vehicle to which the present invention is applied. As shown in FIG. 1, the transmission mechanism 10 includes a transmission case 12 (hereinafter referred to as "a case 12") mounted on a vehicle body as a non-rotary member, an input shaft 14 disposed inside the case 12 as an input rotary member, a differential portion 11 coaxially connected to the input shaft 14 either directly, or indirectly via a pulsation absorbing damper (vibration damping device), not shown, and serving as a continuously variable transmission portion, an automatic transmission portion i.e. automatic shifting portion 20 connected in series in a power transmitting path between the differential portion 11 and drive wheels 34 (see FIG. 7) through a power transmitting member 18 (power transmitting shaft), and an output shaft 22 connected to the automatic transmission portion 20 and serving as an output rotary member.

The transmission mechanism 10 is suitably applied to an FR (front-engine and reverse-drive) type vehicle and mounted on a vehicle along a fore and aft direction thereof. The transmission mechanism 10 is disposed between an engine 8 and a pair of drive wheels 34. The engine 8 includes an internal combustion engine such as a gasoline engine or a diesel engine or the like and serves as a drive-power source. The engine 8 is directly connected to the input shaft 14 in series or indirectly through the pulsation absorbing damper (vibration damping device), not shown. This allows a vehicle drive force to be transferred from the engine 8 to the pair of drive wheels 34 in sequence through a differential gear device 32 (final speed reduction gear) (see FIG. 7) and a pair of drive axles.

With the transmission mechanism 10 of the illustrated embodiment, the engine 8 and the differential portion 11 are directly connected to each other. As used herein, the term "directly connected to each other" refers to a structure under which a direct connection is established between the associated component parts in the absence of a fluid-operated power transmitting apparatus, such as a torque converter or a fluid coupling device or the like, and a connection including, for instance, the pulsation absorbing damper is involved in such a direction connection. It is noted that a lower half of the transmission mechanism 10, which is constructed symmetrically with respect to its axis, is omitted in FIG. 1.

The differential portion 11 includes a first electric motor M1, a power distributing mechanism 16, structured in a mechanical mechanism for mechanically distributing an output of the engine 8 (hereinafter, referred to as "engine output") applied to the input shaft 14, which functions as a differential mechanism through which the engine output is distributed to the first electric motor M1 and the power transmitting member 18, and a second electric motor M2 operatively connected to the power transmitting member 18 to be unitarily rotate therewith. In the illustrated embodiment, both the first and second electric motors M1 and M2 are so-called motor/generators each having a function to generate electric power. The first electric motor M1 has at least a function as an electric power generator for generating a reaction force. The second electric motor M2 has at least a function as a motor (electric motor) serving as a running drive power source to output a vehicle drive force.

The power distributing mechanism 16 includes, as a major component, a first planetary gear set 24 of a single pinion type having a gear ratio ρ1 of about 0.418, for example. The first planetary gear set 24 has rotary elements (elements) composed of a first sun gear S1, a first planetary gear P1, a first carrier CA1 supporting the first planetary gear P1 such that the first planetary gear P1 is rotatable about its axis and about the axis of the first sun gear S1, and a first ring gear R1 meshing with the first sun gear S1 through the first planetary gear P1. Where the numbers of teeth of the first sun gear S1 and the first ring gear R1 are represented by ZS1 and ZR1, respectively, the above gear ratio ρ1 is represented by ZS1/ZR1.

With the power distributing mechanism 16, a first carrier CA1 is connected to the input shaft 14, i.e., the engine 8; a first sun gear S1 is connected to the first electric motor M1; and a first ring gear R1 is connected to the power transmitting member 18. With the power distributing mechanism 16 of such a structure, the three elements of the first planetary gear set 24, i.e., the first sun gear S1, the first planetary gear P1, the first carrier CA1 and the first ring gear R1 are arranged to rotate relative to each other for initiating a differential action, i.e., in a differential state under which the differential action is initiated. This allows the engine output to be distributed to the first electric motor M1 and the power transmitting mechanism 18. Then, a part of the distributed engine output drives the first electric motor M1 to generate electric energy, which is stored and used for rotatably driving the second electric motor M2.

Thus, the differential portion 11 (power distributing mechanism 16) is caused to function as an electric differential device such that, for instance, the differential portion 11 is placed in a so-called continuously variable shifting state (electrically established CVT state) to continuously vary the rotation of the power transmitting member 18 regardless of the engine 8 operating at a given rotational speed. That is, the differential portion 11 functions as an electrically controlled continuously variable transmission to provide a speed ratio γ0 (rotational speed $N_{IN}$ of the input shaft 14/rotational speed $N_{18}$ of the power transmitting member 18) that is continuously variable from a minimum value γ0min to a maximum value γ0max.

The automatic transmission portion 20 includes a single-pinion type second planetary gear set 26, a single-pinion type third planetary gear set 28 and a single-pinion type fourth planetary gear set 30. The automatic transmission portion 20 is a planetary gear type multiple-step transmission operable as a step-variable automatic transmission. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a given gear ratio ρ2 of about "0.562". The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a given gear ratio ρ3 of about "0.425".

The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a given gear ratio ρ4 of, for instance, about "0.421". With the second sun gear S2, second ring gear R2, third sun gear S3, third ring gear R3, fourth sun gear S4 and fourth ring gear R4 having the numbers of gear teeth represented by ZS2, ZR2, ZS3, ZR3, ZS4 and ZR4, respectively, the gear ratios ρ2, ρ3 and ρ4 are expressed by ZS2/ZR2, ZS3/ZR3, and ZS4/ZR4, respectively.

In the automatic transmission portion 20, the second and third sun gears S2, S3 are integrally connected to each other, selectively connected to the power transmitting member 18 through a second clutch C2, and selectively connected to the casing 12 through a first brake B1. The second carrier CA2 is selectively connected to the casing 12 through a fourth brake B4, and the fourth ring gear R4 is selectively connected to the casing 12 through a third brake B3. The second ring gear R2, third carrier CA3 and fourth carrier CA4 are integrally connected to each other and connected to the output shaft 22. The third ring gear R3 and the fourth sun gear S4 are integrally connected to each other and selectively connected to the power transmitting member 18 through a first clutch C1.

Thus, the automatic transmission portion 20 and the differential portion 11 (power transmitting member 18) are selectively connected to each other through the first clutch C1 or the second clutch C2, which is provided to establish each gear position (shift gear position) in the automatic transmission portion 20. In other words, the first and second clutches C1, C2 function as coupling devices i.e., engaging device operable to place the power transmitting path between the power transmitting member 18 and the automatic transmission portion 20, that is, the power transmitting path between the differential portion 11 (power transmitting member 18) and the drive wheels 34, selectively in one of a power transmitting state in which the vehicle drive force can be transmitted through the power transmitting path, and the power cut-off state in which the vehicle drive force cannot be transmitted through the power transmitting path. That is, with at least one of the first and second clutches C1 and C2 brought into coupling engagement, the power transmitting path is placed in the power transmitting state. In contrast, uncoupling both the first and second clutches C1 and C2 places the power transmitting path in the power cut-off state.

With the automatic transmission portion 20, further, uncoupling an on-uncoupling coupling device while coupling an on-coupling coupling device allows a so-called "clutch-to-clutch" shifting action to be executed for respective gear positions to be selectively established. This allows a speed ratio γ (rotational speed $N_{18}$ of the power transmitting member 18/rotational speed $N_{OUT}$ of the output shaft 22) to be obtained in equally varying ratio for each gear position. As indicated in the coupling operation table shown in FIG. 2, coupling the first clutch C1 and third brake B3 establishes 1st-speed gear position having a speed ratio γ1 of approximately, for instance, "3.357".

With the first clutch C1 and fourth brake B4 coupled in operation, a 2nd-speed gear position is established with a speed ratio γ2 of, for instance, approximately "2.180", which is lower a value of the speed ratio γ1. With the first clutch C1 and first brake B1 coupled in operation, a 3rd-speed gear position is established with a speed ratio γ3 of, for instance, approximately "1.424", which is lower a value of the speed ratio γ2. Coupling the first clutch C1 and second clutch C2 establishes a 4th-speed gear position with a speed ratio γ4 of, for instance, approximately "1.000", which is lower than the speed ratio γ3. Coupling the second clutch C2 and third brake B3 establishes a reverse-drive gear position (reverse-drive shift position) with a speed ratio γR of, for instance, approximately 3.209, which is intermediate between those of the 1st-speed gear position and the 2nd-speed gear position. In addition, uncoupling i.e., disengaging or releasing the first clutch C1, second clutch C2, first brake B1, second brake B2 and third brake B3 allows a neutral position N to be established.

Further, a one-way-clutch F1 is mounted on a case 12 in parallel to the third brake B3 as an element to lock the rotation of a fourth ring gear R4 of a fourth planetary gear set 30. The one-way clutch F1 is comprised of, for instance, a sprag type or roller type one-way clutch that has been frequently used in a vehicular automatic transmission of the related art. When the fourth ring gear R4 tends to rotate clockwise relative to the case 12, the one-way clutch F1 is brought into engagement with the case 12. In contrast, when the fourth ring gear R4 tends to rotate counter-clockwise, the one-way clutch F1 freewheels i.e. idly rotates.

As a result of the one-way clutch F1 being provided, a 1st-speed gear position is established with preliminary engagements of the first clutch C1 and the one-way clutch F1. That is, when the vehicle is powered on to run forward with the clutch C1 held in engagement, the one-way clutch F1 is brought into engagement at an appropriate timing. Thus, the 1st-speed gear position can be smoothly established without controllably engaging the third brake B3.

Further, a second brake B2 is mounted on the case 12 in parallel to the fourth brake B4 to act as an element to block the rotation of a second carrier CA2 of a second planetary gear set 26 for invalidating the one-way clutch F2 and the operation thereof with respect to the case 12. The one-way clutch F2 is also comprised of, for instance, the sprag type or roller type one-way clutch. When the second carrier CA2 tends to rotate clockwise relative to the case 12, the one-way clutch F2 is brought into engagement with the case 12. In contrast, when the one-way clutch F2 tends to rotate counter-clockwise, the one-way clutch F2 freewheels i.e. idly rotates.

Furthermore, the second brake B2 is engaged in a 2nd-speed gear position as shown in FIG. 2. Therefore, when the second carrier CA2 tends to rotate clockwise relative to the case 12 in the 2nd-speed gear position, the case 12 and the one-way clutch F2 are brought into engagement with each other. In addition, the one-way clutch F2 and the second brake B2 remains engaged with each other. This blocks the rotation of the second carrier CA2. On the contrary, if the second carrier CA2 tends to rotate counter-clockwise relative to the case 12 in the 2nd-speed gear position, then the one-way clutch F2 freewheels. Moreover, in the other gear position than the 2nd-speed gear position, the second brake B2 is disengaged regardless of the rotation of the one-way clutch F2, thereby permitting the rotation of the second carrier CA2.

As a result of such a one-way clutch F2 being provided, the 2nd-speed gear position can be established even with the first clutch C1, the second brake B2 and the one-way clutch F2 being brought into engagement. That is, when the vehicle is powered on to run forward with the first clutch C1 and the second brake B2 preliminarily remained engaged, the one-way clutch F2 is brought into engagement at a proper timing. Thus, the 2nd-speed gear position can be smoothly established without controllably engaging the second brake B2.

The first clutch C1, second clutch C2, first brake B1, second brake B2, third brake B3, and fourth brake B4 (hereinafter collectively referred to as clutch C and brake B, unless otherwise specified) are hydraulically operated frictional coupling devices that are used in the related art vehicular automatic transmission. Each of these frictional coupling devices may include a wet-type multiple-disc clutch, having a plurality of mutually overlapping friction plates adapted to be pressurized against each other by a hydraulic actuator, or a band brake including a rotary drum having an outer circumferential surface on which one band or two bands are wound with terminal ends being adapted to be tightened by a hydraulic actuator. Thus, the frictional coupling device serves to selectively provide a drive connection between two component parts between which each clutch or brake is interposed.

With the transmission mechanism 10 of such a structure, the differential portion 11, serving as the continuously variable transmission, and the automatic transmission portion 20 constitute a continuously variable transmission. Further, with the differential portion 11 controlled so as to provide a speed ratio kept at a fixed level, the differential portion 11 and the automatic transmission portion 20 can provide the same state as that of a step-variable transmission.

More particularly, the differential portion 11 functions as the continuously variable transmission and the automatic transmission portion 20, connected to the differential portion 11 in series, functions as the step-variable transmission. Thus, the rotational speed, input to the automatic transmission portion 20 placed for at least one gear position M, (hereinafter referred to as "input rotational speed of the automatic transmission portion 20"), i.e., the rotational speed of the power transmitting member 18 (hereinafter referred to as "transmitting-member rotational speed $N_{18}$") are caused to continuously vary, thereby enabling the gear position M to have a continuously variable speed range. Accordingly, the transmission mechanism 10 provides an overall speed ratio γT (rotational speed $N_{IN}$ of the input shaft 14/rotational speed $N_{OUT}$ of the output shaft 22) in a continuously variable range. Thus, the continuously variable transmission is established in the transmission mechanism 10. The overall speed ratio γT of the transmission mechanism 10 is the total speed ratio γT of a whole of the automatic transmission portion 20 that is established based on the speed ratio γ0 of the differential portion 11 and the speed ratio γ of the automatic transmission portion 20.

For the respective gear positions such as, for instance, the 1st-speed to 4th-speed gear positions of the automatic transmission portion 20 and the reverse-drive gear position as indicated in the coupling operation table shown in FIG. 2, the transmitting-member rotational speed $N_{18}$ is continuously varied with each gear position being obtained in a continuously variable speed range. Accordingly, a continuously variable speed ratio is present between adjacent gear positions, enabling the whole of the transmission mechanism 10 to have the total speed ratio γT in a continuously variable range.

Further, the speed ratio γ0 of the differential portion 11 is controlled so as to lay at a fixed level and the clutch C and brake B are selectively coupled, thereby causing either one of the 1st-speed to 4th-speed gear positions or the reverse-drive gear position (reverse-drive shift position) to be selectively established. This allows the overall speed ratio γT, variable in a nearly equal ratio, of the transmission mechanism 10 to be obtained for each gear position. Thus, the transmission mechanism 10 can be established in the same state as that of the step-variable transmission.

If, for instance, the differential portion 11 is controlled so as to provide the speed ratio γ0 at a fixed value of "1", the transmission mechanism 10 provides the total speed ratio γT for each gear position of the 1st-speed to 4th-speed gear positions of the automatic transmission portion 20 and the reverse-drive gear position as indicated by the coupling operation table shown in FIG. 2. Further, if the automatic transmission portion 20 is controlled under the 4th-speed gear position so as to cause the differential portion 11 to have the speed ratio γ0 of approximately, for instance, "0.7" less than a value of "1", the automatic transmission portion 20 has the total speed ratio γT of approximately, for instance, "0.7" that is less than a value of the 4th-speed gear position.

Figure 3:
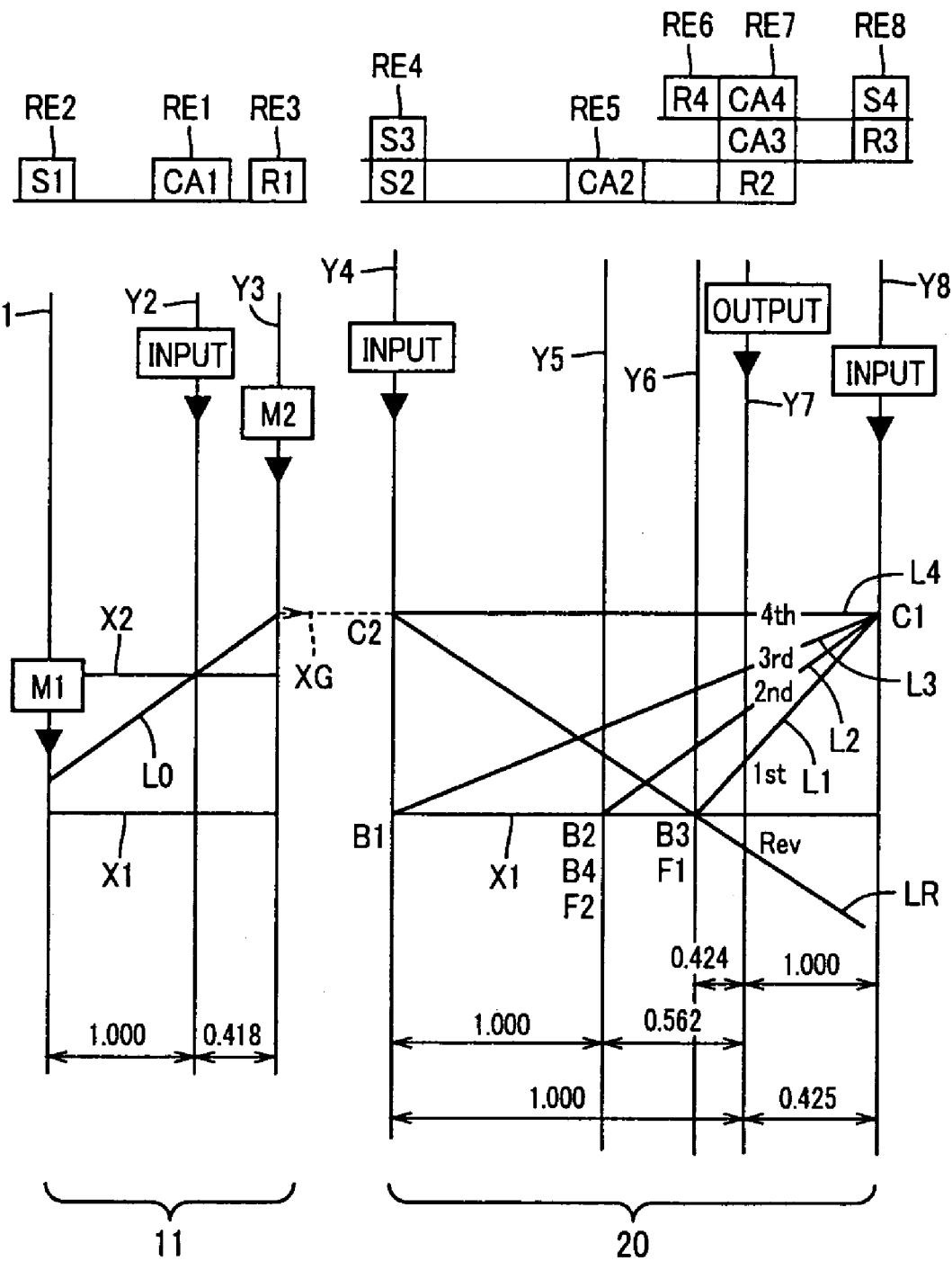
FIG. 3 is a collinear chart indicating mutually relative rotating speeds of rotary elements establishing various gear positions in the power transmitting apparatus shown in FIG. 1.

FIG. 3 is a collinear chart for the transmission mechanism 10, including the differential portion 11 and the automatic transmission portion 20, wherein the relative motion relationships among the rotational speeds of the various rotary elements in different coupling states for each gear position can be plotted on straight lines. The collinear chart of FIG. 3 takes the form of a two-dimensional coordinate system having the abscissa axis plotted with the gear ratios ρ of the planetary gear sets 24, 26, 28, 30 and the ordinate axis plotted with the mutually relative rotating speeds of the rotary elements. A transverse line X1 indicates the rotational speed that is zeroed; a transverse line X2 the rotational speed of "1.0", that is, the rotating speed $N_E$ of the engine 8 connected to the input shaft 14; and a transverse line XG the rotational speed of the power transmitting member 18.

Starting from the left, three vertical lines Y1, Y2 and Y3, associated with the three elements of the power distributing mechanism 16 forming the differential portion 11, represent the mutually relative rotating speeds of the first sun gear S1 corresponding to a second rotary element (second element) RE2, the first carrier CA1 corresponding to a first rotary element (first element) RE1, and the first ring gear R1 corresponding to a third rotary element (third element) RE3, respectively. A distance between the adjacent vertical lines is determined based on the gear ratio ρ1 of the first planetary gear set 24.

Starting from the left, further, five vertical lines Y4, Y5, Y6, Y7 and Y8 for the automatic transmission portion 20 represent the mutually relative rotating speeds of: the second and third sun gears S2, S3, connected to each other, which corresponds to a fourth rotary element (fourth element) RE4; the second carrier CA2 corresponding to a fifth rotary element (fifth element) RE5; the fourth ring gear R4a corresponding to a sixth rotary element (sixth element) RE6; the second ring gear R2, third carriers CA3 and fourth carriers CA4, connected to each other, which correspond to a seventh rotary element (seventh element) RE7; and the third ring gear R3 and fourth sun gear S4 connected to each other and corresponding to an eighth rotary element (eighth element) RE8, respectively. Each distance between the adjacent vertical lines is determined based on the gear ratios ρ2, ρ3 and ρ4 of the second, third and fourth planetary gear sets 26, 28, 30.

In the relationship among the vertical lines on the collinear chart, if a space between the sun gear and carrier is set to a distance corresponding to a value of "1", then, a space between the carrier and ring gear lies at a distance corresponding to the gear ratio ρ of the planetary gear set. That is, for the differential portion 11, a space between the vertical lines Y1 and Y2 is set to a distance corresponding to a value of "1" and a space between the vertical lines Y2 and Y3 is set to a distance corresponding to the gear ratio ρ1. For the automatic transmission portion 20, further, the space between the sun gear and carrier is set to the distance corresponding to the value of "1" for each of the second, third and fourth planetary gear sets 26, 28, 30, for which the space between the carrier and ring gear is set to the distance corresponding to the gear ratio ρ1.

Referring to the collinear chart of FIG. 3, the power distributing mechanism 16 (differential portion 11) of the transmission mechanism 10 is arranged such that the first rotary element RE1 (first carrier CA1) of the first planetary gear set 24 is connected to the input shaft 14, i.e., the engine 8 and the second rotary element RE2 is connected to the first electric motor M1. The third rotary element RE3 (first ring gear R1) is connected to the power transmitting member 18 and the second electric motor M2. Thus, a rotary motion of the input shaft 14 is transmitted (input) to the automatic transmission portion 20 through the power transmitting member 18. A relationship between the rotational speeds of the first sun gear S1 and the first ring gear R1 is represented by an inclined straight line L0 which passes across a point of intersection between the lines Y2 and X2.

Now, description is made of a case in which, for example, the differential portion 11 is placed in a differential state with the first to third rotary elements RE1 to RE3 enabled to rotate relative to each other while the rotational speed of the first ring gear R1, indicated at an intersecting point between the straight line L0 and the vertical line Y1, is bound with the vehicle speed V and remains at a nearly constant level. In this case, as the engine speed $N_E$ is controlled with the rotational speed of the first carrier CA1, as represented by an intersecting point between the straight line L0 and the vertical line Y2, being raised or lowered, the rotational speed of the first sun gear S1, i.e., the rotational speed of the first electric motor M1, indicated by an intersecting pint between the straight line L0 and the vertical line Y1, is raised or lowered.

On controlling the rotational speed of the first electric motor M1 so as to allow the differential portion 11 to have the speed ratio γ0 of "1" with the first sun gear S1 rotating at the same speed as the engine speed $N_E$, the straight line L0 is aligned with the horizontal line X2. When this takes place, the first ring gear R1, i.e., the power transmitting member 18, is caused to rotate at the same speed as the engine speed $N_E$. On the contrary, if the rotational speed of the first electric motor M1 is controlled so as to allow the differential portion 11 to have the speed ratio γ0 of a value less than "1", for instance, a value of approximately "0.7" with the rotational speed of the first sun gear S1 being zeroed, the power transmitting member 18 is caused to rotate at an increased transmitting-member rotational speed $N_{18}$ higher than the engine speed $N_E$.

With the automatic transmission portion 20, the fourth rotary element RE4 is selectively connected to the power transmitting member 18 via the second clutch C2 and selectively connected to the casing 12 via the first brake B1 with the fifth rotary element RE5 being selectively connected to the casing 12 via the second brake B2. The sixth rotary element RE6 is selectively connected to the casing 12 via the third brake B3 with the seventh rotary element RE7 connected to the output shaft 22, and the eighth rotary element RE8 is selectively connected to the power transmitting member 18 via the first clutch C1. As mentioned above, the fifth rotary element RE5 can be selectively connected to the case 12 through the second brake B2 and the one-way clutch F2, and the sixth rotary element RE6 can be selectively connected to the case 12 through the one-way clutch F1.

Next, description is made of a case wherein with the automatic transmission portion 20, the differential portion 11 is placed in a state with the straight line L0 brought into coincidence with the horizontal line X2 to cause the differential portion 11 to transfer the vehicle drive force to the eighth rotary element RE8 at the same speed as the engine speed $N_E$ upon which the first clutch C1 and the third brake B3 are coupled as shown in FIG. 3. In this case, the rotational speed of the output shaft 22 for the 1st-speed gear position is represented by an intersecting point between the inclined line L1, passing across an intersecting point between the vertical line Y8, indicative of the rotational speed of the eighth rotary element RE8, and the horizontal line X2 and a point of intersection between the vertical line Y6, indicative of the rotational speed of the sixth rotary element RE6, and the horizontal line X1, and an intersecting point intersecting the vertical line Y7 indicative of the rotational speed of the seventh rotary element RE connected to the output shaft 22 as indicated in FIG. 3.

Similarly, the rotational speed of the output shaft 22 for the 2nd-speed gear position is represented by an intersecting point between an inclined straight line L2, determined when the first clutch C1 and second brake B2 are coupled, and the vertical line Y7 indicative of the rotational speed of the seventh rotary element RE7 connected to the output shaft 22. The rotational speed of the output shaft 22 for the 3rd-speed gear position is represented by an intersecting point between an inclined straight line L3, determined with the first clutch C1 and first brake B1 being coupled, and the vertical line Y7 indicative of the rotational speed of the seventh rotary element RE7 connected to the output shaft 22. The rotational speed of the output shaft 22 for the 4th-speed gear position is represented by an intersecting point between a horizontal straight line L4, determined with the first clutch C1 and second brake B2 being coupled, and the vertical line Y7 indicative of the rotational speed of the seventh rotary element RE7 connected to the output shaft 22.

Figure 4:
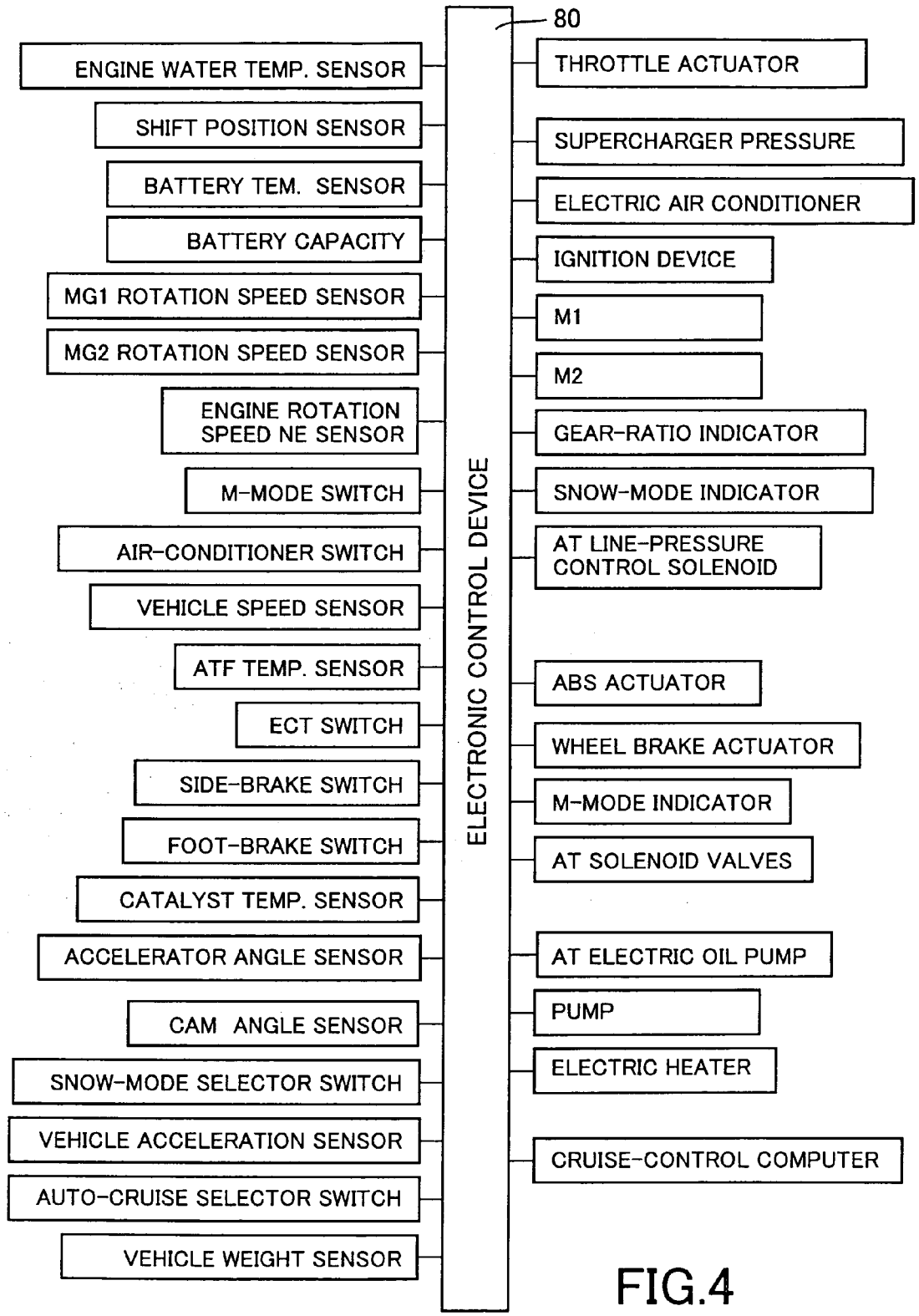
FIG. 4 is a view showing an electronic control unit with input and output signals associated therewith which is provided in the power transmitting apparatus shown in FIG. 1.

FIG. 4 shows an electronic control unit 80 operative to control the transmission mechanism 10 of the present invention for generating various output signals in response to various input signals. The electronic control unit 80 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and first and second electric motors M1 and M2, and drive controls such as shifting controls of the automatic transmission portion 20.

The electronic control unit 80, connected to various sensors and switches as shown in FIG. 4, receives various signals such as: a signal indicative of an engine coolant temperature $TEMP_W$; a signal indicative of a shift position $P_{SH}$ selected with a shift lever 52 (shown in FIG. 7) and a signal indicative of the number of operations initiated on the "M" position; a signal indicative of the engine speed $N_E$ representing the rotational speed of the engine 8; a signal commanding an M mode (manual shift running mode); a signal indicative of an operated state of an air conditioner; a signal indicative of the rotational speed (hereinafter referred to as "output shaft speed") $N_{OUT}$ of the output shaft 22; a signal indicative of temperature of ATF (hereinafter referred to as "ATF temperature) used for control operation of the automatic transmission portion 20.

The electronic control unit 80 also receives a signal indicative of a side brake under operation; a signal indicative of a foot brake under operation; a signal indicative of a temperature of a catalyst; a signal indicative of an accelerator opening Acc representing an operating stroke of an accelerator pedal when manipulated by a driver for his output demand value; a signal indicative of a cam angle; a signal indicative of a snow mode under setting; a signal indicative of a fore and aft acceleration value G of the vehicle; a signal indicative of an auto-cruising drive mode; a signal indicative of a weight vehicle weight) of the vehicle; a signal indicative of a wheel velocity of each drive wheel; a signal indicative of a rotational speed $N_{M1}$ of the first electric motor M1 (hereinafter referred to as "first-electric motor speed $N_{M1}$); and a signal indicative of a rotational speed $N_{M2}$ of the second electric motor M2 (hereinafter referred to as "second-electric motor speed $N_{M2}$.

The electronic control unit 80 generates various signals including: a control signal applied to an engine output control device 58 (see FIG. 7) for controlling an engine output, i.e., a drive signal applied to a throttle actuator 64 for controlling a throttle valve opening $\theta_{TH}$ of an electronic throttle valve 62 disposed in an intake manifold 60 of the engine 8; a fuel supply quantity signal applied to a fuel injecting device 66 for controlling an amount of fuel injected into the intake manifold 60 or cylinders of the engine 8; an ignition signal applied to an ignition device 68 to control the ignition timing of the engine 8; a supercharger pressure regulation signal for regulating a supercharger pressure of the engine 8; an electric air-conditioner drive signal for actuating an electric air conditioner; command signals for commanding the operations of the first and second electric motors M1 and M2; a shift-position (manipulated position) display signal for actuating a shift-range indicator; a gear-ratio indicating signal for displaying the gear ratio.

The electronic control unit 80 also generates snow-mode display signal for displaying the presence of a snow-mode; an M-mode display signal for displaying an M-mode being selected; valve command signals for actuating electromagnetic valves (linear solenoid valves), incorporated in the hydraulic control unit 70 (see FIGS. 5 and 7) for controlling the hydraulically operated frictional coupling devices of the differential portion 11 and automatic transmission portion 20; a signal for regulating a regulator valve (pressure regulator valve), incorporated in the hydraulic control unit 70, to regulate a line pressure PL; a drive command signal for actuating an electric hydraulic pump acting as a hydraulic original-pressure source for the line pressure $P_L$ to be regulated; a signal for driving an electric heater; and a signal applied to a cruise-control computer.

Figure 5:
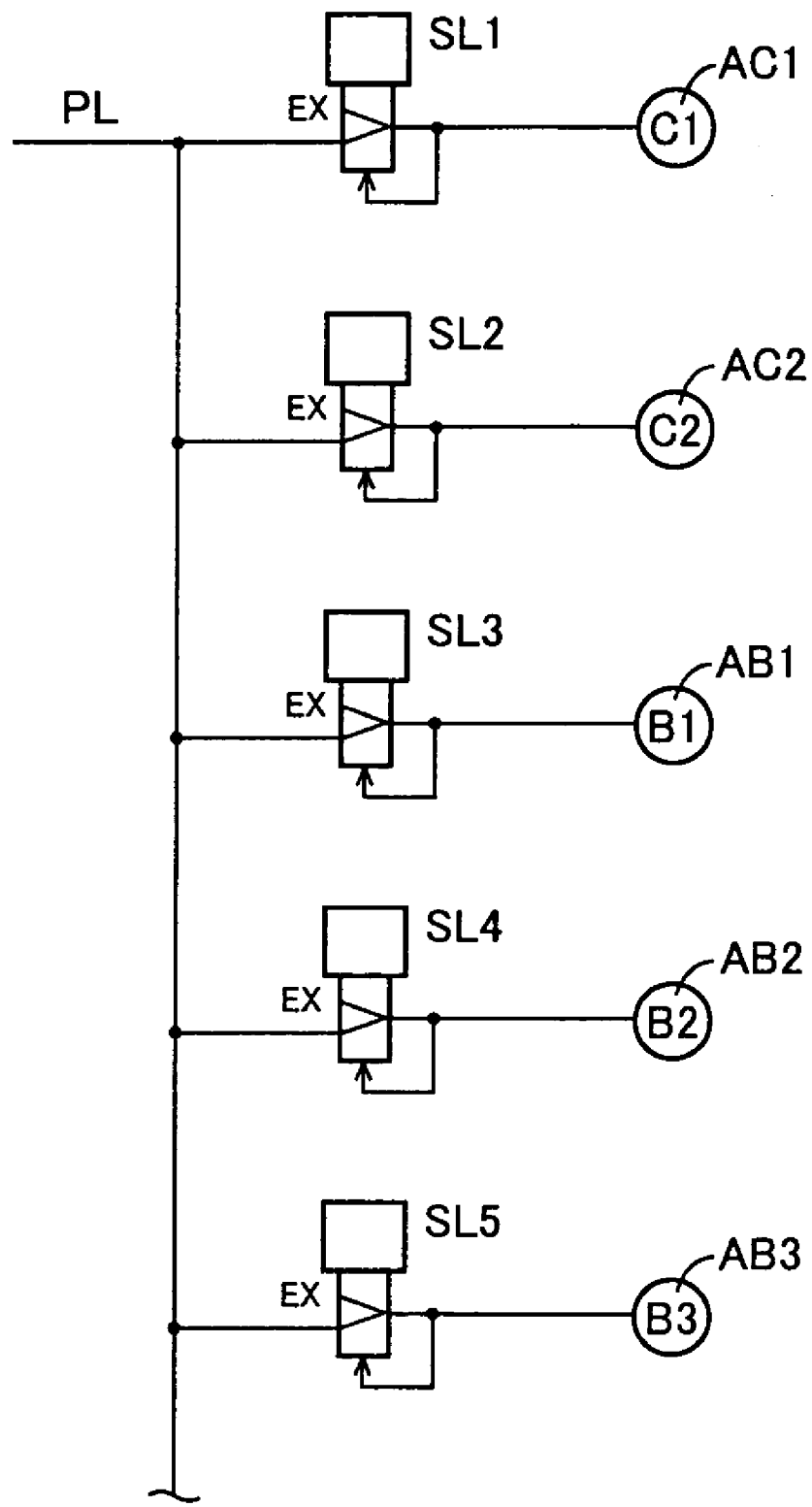
FIG. 5 is a circuit diagram showing a hydraulic control circuit associated with linear solenoid valves arranged-to control operations of respective hydraulic actuators of clutches and brakes.

FIG. 5 is a circuit diagram related to linear solenoid valves SL1 to SL5 of the hydraulic control circuit 70 for controlling the operations of respective hydraulic actuators (hydraulic cylinders) AC1, AC2, AB1, AB2, AB3 of the clutches C1, C2 and brakes B1 to B3.

As shown in FIG. 5, the hydraulic actuators AC1, AC2, AB1, AB2, AB3 are connected to the respective linear solenoid valves SL1-SL5, which are controlled in response to control commands, delivered from the electronic control unit 80. This adjusts the line pressure PL into respective clutch engaging pressures PC1, PC2, PB1, PB2 and PB3 to be applied directly to the respective hydraulic actuators AC1, AC2, AB1, AB2, AB3. The line pressure PL represents an original hydraulic pressure, generated by an electrically operated hydraulic oil pump (not shown) or a mechanical oil pump driven by the engine 30, which is regulated by a relief-type pressure regulator valve depending on a load of the engine 8 in terms of an accelerator opening displacement $A_{CC}$ or a throttle valve opening $\theta_{TH}$.

The linear solenoid valves SL1 to SL5, fundamentally formed in the same structure, are independently energized or de-energized with the electronic control unit 80. This allows the hydraulic actuators AC1, AC2, AB1, AB2, AB3 to independently and controllably regulate hydraulic pressures, thereby controlling the clutch engaging pressures PC1, PC2, PB1, PB2, PB3. With the automatic transmission portion 20, predetermined coupling devices are coupled in a pattern indicated on, for instance, the coupling-operation indicating table shown in FIG. 2, thereby establishing various gear positions. In addition, during the shifting control of the automatic transmission portion 20, a so-called clutch-to-clutch shifting is executed to simultaneously control the coupling or uncoupling of the clutches C and the brakes B relevant to the shifting operations.

Figure 6:
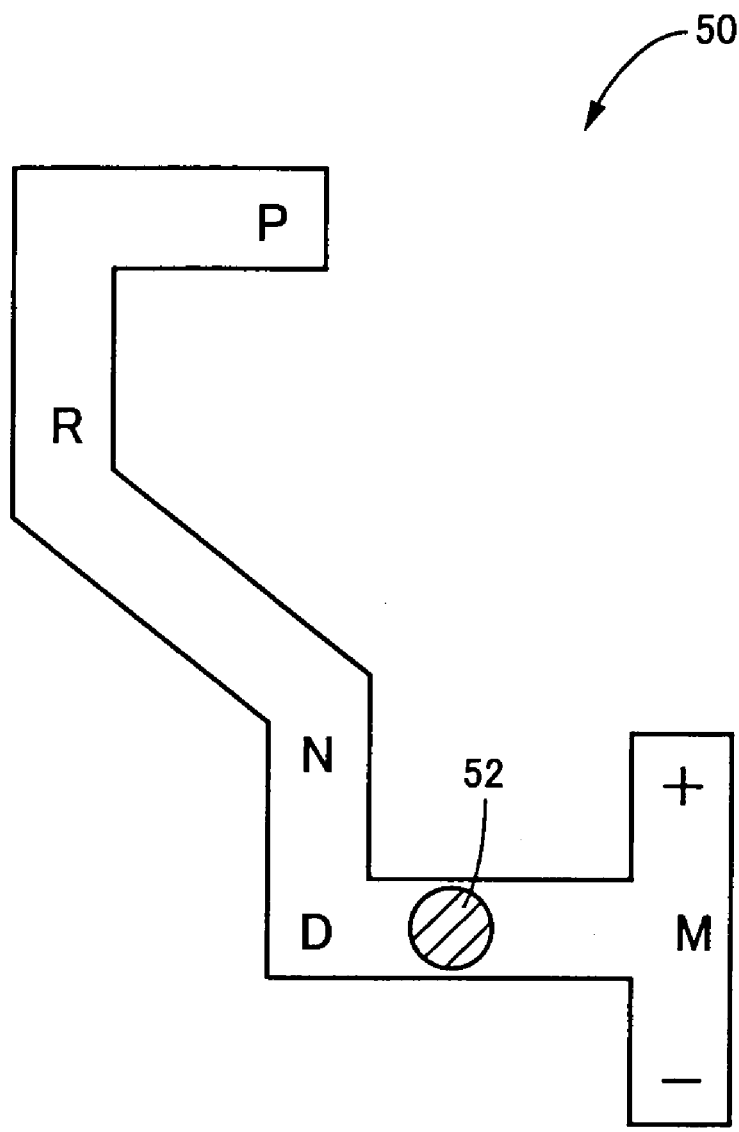
FIG. 6 is a view showing one example of a manually operated shifting device including a shift lever and operable to select one of a plurality of shift positions of multiple kinds.
Figure 6:
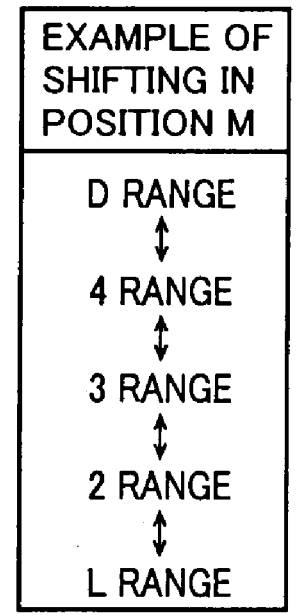

FIG. 6 is a view showing one example of a manually operated shifting device 50 serving as a changeover device operative to shift multiple kinds of shift positions $P_{SH}$ on manual operation. The shifting device 50 is mounted in, for instance, an area lateral to a driver's seat and includes a shift lever 52 to be manipulated for selecting one of the plurality of shift positions $P_{SH}$.

The shift lever 52 has a parking position "P" (Parking) under which an inside of the transmission mechanism 10, i.e., the power transmitting path inside the automatic transmission portion 20 is shut off in a neutral condition, i.e., a neutral state with the output shaft 22 of the automatic transmission portion 20 remained in a locked state; a reverse drive position "R" (Reverse) for a reverse drive mode; a neutral position "N" (Neutral) for the power transmitting path of the transmission mechanism 10 to be shut off in the neutral state; an automatic forward-drive running position "D" (Drive); and a manual-shift forward-drive position "M" (Manual).

In the automatic forward-drive running position "D", an automatic shift mode is established for executing an automatic shift control within a varying range of a shiftable total speed ratio γT of the transmission mechanism 10 resulting from various gear positions whose automatic shift control is performed in a continuously variable speed ratio width of the differential portion 11 and a range of the 1st-speed to the 4th-speed gear positions of the automatic transmission portion 20. The manual-shift forward-drive position "M" is manually shifted to establish a manual-shift forward-drive mode (manual mode) for setting a so-called shift range to limit a shifting gear position on a high speed range during the operation of the automatic transmission portion 20 under the automatic shift control.

As the shift lever 52 is shifted to the various shift positions $P_{SH}$, the hydraulic control circuit 70 is electrically switched, thereby obtaining the reverse-drive "R" gear position, the neutral position "N" and the various gear shift positions or the like in the forward-drive gear position "D".

Among the various shift positions $P_{SH}$ represented in the "P" to "M" positions, the "P" and "N" positions represent non-running positions selected when no vehicle is caused to run. That is, the "P" and "N" positions represent non-drive positions selected when the first and second clutches C1, C2 select to cause the power transmitting path to be switched to a power cut-off state like a situation where as indicated in, for instance, the coupling operation indicating table shown in FIG. 2, both the first and second clutches C1, C2 are uncoupled to interrupt the power transmitting path inside the automatic transmission portion 20 so as to disenable the driving of the vehicle.

The "R", "D" and "M" positions represent running positions selected when the vehicle is caused to run. That is, these positions represent drive positions selected when the first and/or second clutches C1, C2 select to cause the power transmitting path to be switched to a power transmitting state like a situation where as indicated in, for instance, the coupling operation indicating table shown in FIG. 2, at least one of the first and second clutches C1, C2 is coupled to establish the power transmitting path inside the automatic transmission portion 20 so as to enable the vehicle to be driven.

More particularly, as the shift lever 52 is manually shifted from the "P" position or the "N" position to the "R" position, the second clutch C2 is coupled to cause the power transmitting path of the automatic transmission portion 20 to be switched from the power cut-off state to the power transmitting state. With the shift lever 52 manually shifted from the "N" position to the "D" position, at least the first clutch C1 is coupled to switch the power transmitting path of the automatic transmission portion 20 from the power cut-off state to the power transmitting state. Further, as the shift lever 52 is manually shifted from the "R" position to the "P" or "N" position, the second clutch C2 is uncoupled to switch the power transmitting path of the automatic transmission portion 20 from the power transmitting state to the power cut-off state. With the shift lever 52 manually shifted from the "D" position to the "N" position, the first clutch C1 or second clutch C2 is uncoupled to switch the power transmitting path of the automatic transmission portion 20 from the power transmitting state to the power cut-off state.

Further, with the shift lever 52 placed in the "D" position, the shifting is executed using a whole of the gear positions, i.e. 1st-speed to 4th-speed gear positions, in the automatic shifting portion 20. Therefore, this position is also referred to as a "D" range. Furthermore, with the shift lever 52 placed in the "M" position, a shift range can be selected from the "4" range to the "1" range. This allows the shifting to be executed using the gear position associated with each range.

More particularly, for instance, with the "4" range selected, the shifting is executed using one of the 1st-speed to 4th-speed gear positions. With the "3" range selected, the shifting is executed using one of the 1st-speed to 3rd-speed gear positions. With the "2" range selected, the shifting is executed using one of the 1st-speed and 2nd-speed gear positions. With the "1" range selected, the shifting is executed using only the 1st-speed gear position. In addition, the "M" position has an indication area, extending in a fore and aft direction of the vehicle, which is provided with an upshift position "+" and a downshift position "−". In this case, shifting the shift lever 52 to the upshift position "+" or the downshift position "−" results in a shift to any one of the "1" to "4" ranges.

The shift lever 52 has urging means such as, for instance, a spring or the like, through which the shift lever 52 is automatically returned to the "M" position from the upshift position "+" and the downshift position "−". In addition, depending on the number of times and time periods for the shift lever 52 to be placed in the upshift position "+" and the downshift position "−", the "1" to "4" ranges are selectively switched. Moreover, when the shift lever 52 is shifted from the "D" position to the "M" position, for instance, the "4" range is selected. When the shift lever 52 is shifted from the "M" position to the "D" position, then the "D" range is selected. The "D" range and the "1" range to the "4" range, representing the gear positions for the forward drive, will be referred to as a "Forward Range".

Figure 7:
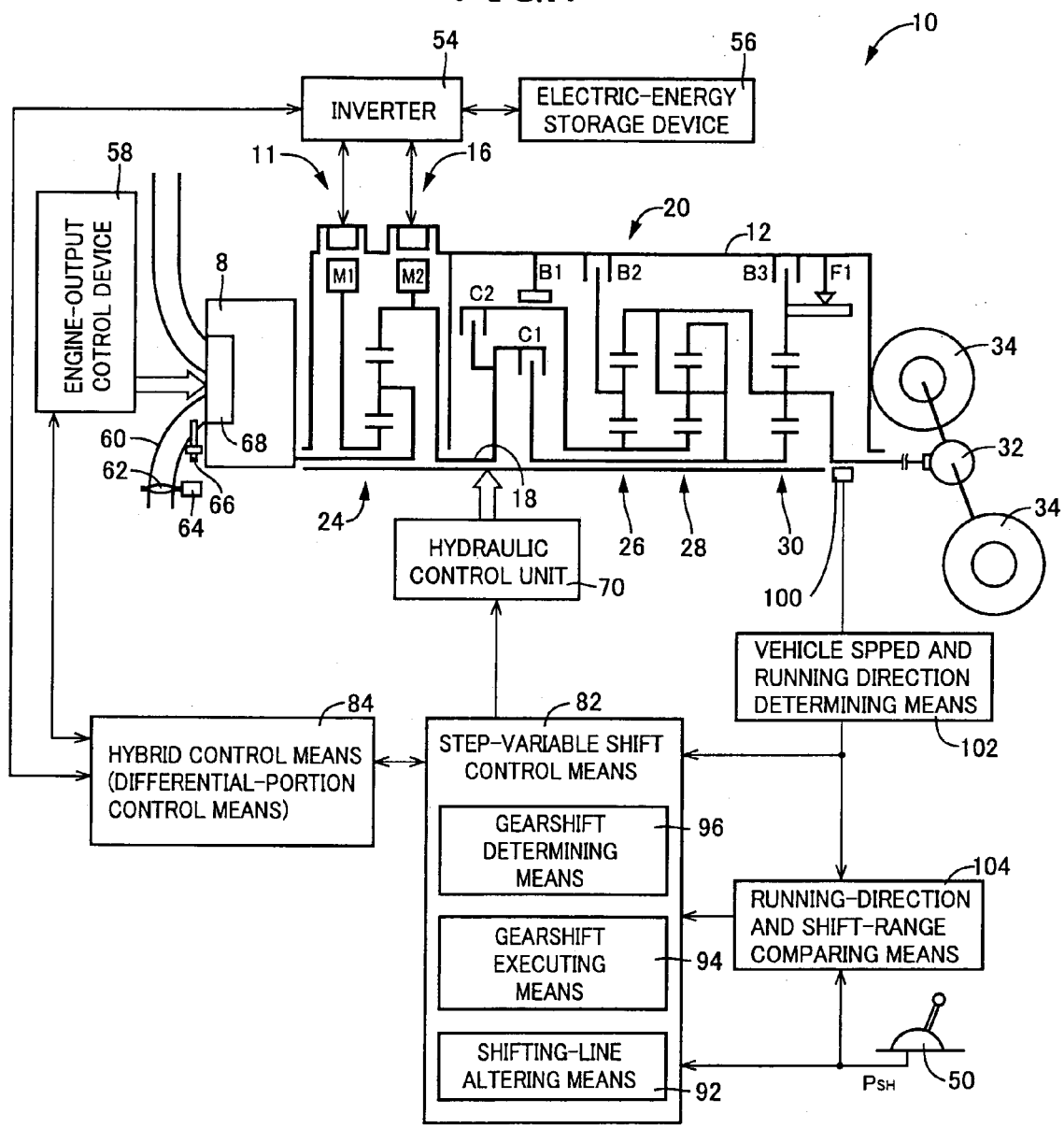
FIG. 7 is a functional block diagram illustrating major control functions of the electronic control unit of FIG. 4.
Figure 8:
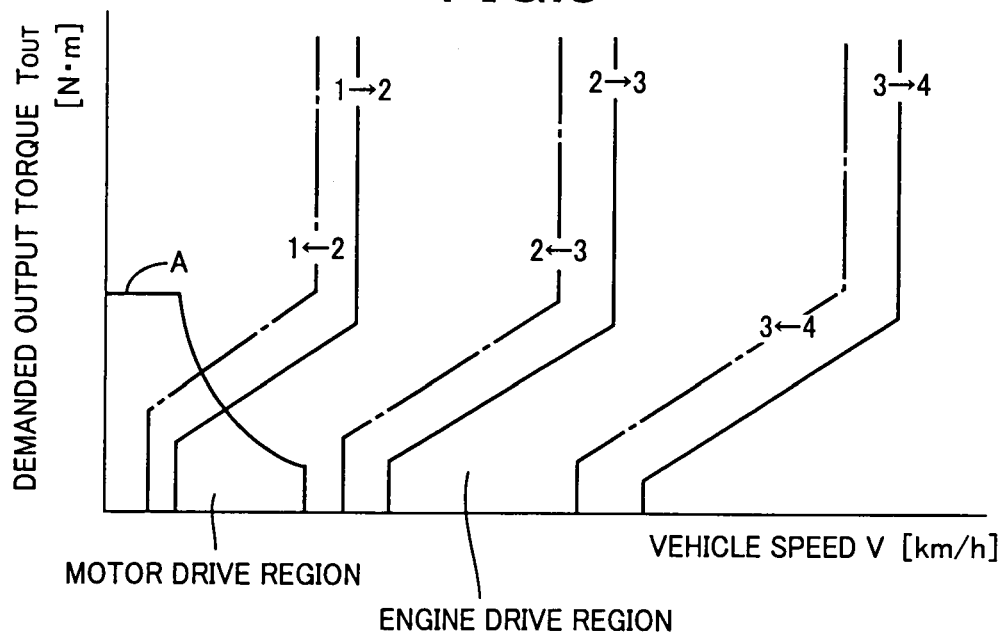
FIG. 8 is a view illustrating one example of a shifting map for use in performing a shifting control of the drive apparatus, and one example of drive-power-source map for use in a drive-power-source switching control between an engine-drive mode and a motor-drive mode, with those maps being related to each other.

FIG. 7 is a functional block diagram illustrating a major part of a control function to be executed with the electronic control device 80. In FIG. 7, step-variable shift control means 82, operative to control the shifting in the automatic shifting portion 20, is comprised of shifting-line altering means 92, gearshift determining means 94 and gearshift executing means 96. Among these, the gearshift determining means 94 determines whether to execute the shifting in the automatic shifting portion 20, i.e. a gear position to be shifted. Such a determination is made by referring to the relationship (shifting line diagram and shifting map) as shown in FIG. 8 having upshift lines (in solid lines) and downshift lines (in single dot lines) that are preliminarily stored in terms of parameters such as a vehicle speed V and a drive-force-related value such as, for instance, demanded output torque $T_{OUT}$. This determination is made based on an actual vehicle speed V and a vehicle condition indicated by demanded output torque $T_{OUT}$.

The gearshift executing means 96 allows the automatic shifting portion 20 to execute an automatic shifting control so as to establish the determined gear position. Demanded output torque $T_{OUT}$ is calculated based on, for instance, a depressing stroke of an accelerator pedal. In addition, vehicle speed and running direction determining means 102 calculates the vehicle speed V based on, for instance, a rotation speed of an output shaft 22 detected by an output-shaft rotation sensor 100, which will be described below.

During such a calculation, the gearshift executing means 96 outputs a command (a shifting output command and a hydraulic pressure command) to a hydraulic pressure control circuit 70 for engaging or disengaging hydraulically controlled frictional engaging devices involved in the shifting of the automatic shifting portion 20 executed in accordance with, for instance, the engagement operation table shown in FIG. 2. In other words, this command causes a disengagement-side engaging device, involved in the shifting of the automatic shifting portion 20, to be disengaged while causing an engagement-side engaging device to be engaged for thereby executing the shifting. The hydraulic pressure control circuit 70 actuates a linear solenoid valve SL for operating hydraulic actuators of the hydraulically controlled frictional engaging devices, involved in the shifting of the automatic shifting portion 20, in response to the command. This allows, for instance, the disengagement-side engaging device to be disengaged while engaging the engagement-side engaging device such that the shifting is executed in the automatic shifting portion 20.

Hybrid control means 84 functioning as the differential-portion controlling means operates the engine 8 in an optimum operating range at a high efficiency, while distributing the drive forces of the engine 8 and the second electric motor M2 at optimum rates and optimally varying a reacting force of the first electric motor M1 during the operation thereof to generate electric power. Thus, the differential portion 11 is controllably operated under an electrically controlled continuously variable transmission to control a speed ratio γ0. At a vehicle speed V during the vehicle running in one occasion, for instance, a target (demanded) output for the vehicle is calculated based on the accelerator opening Acc and the vehicle speed V both representing output demanded variables of the driver, after which a demanded total target output is calculated based on the target output of the vehicle and a battery charge demanded value.

Subsequently, a target engine output is calculated in consideration of a loss in power transmission, loads of auxiliary units, assist torque of the second electric motor M2 or the like so as to obtain the total target output. Then, the hybrid control means 84 controls the engine 8, while controlling a rate of electric power being generated by the first electric motor M1, so as to obtain the engine speed $N_E$ and engine torque $T_E$ such that the target engine output is obtained.

The hybrid control means 84 executes such controls in consideration of, for instance, the gear position of the automatic transmission portion 20 with a view to increasing a dynamic performance and improving fuel consumption. During such hybrid controls, the differential portion 11 is caused to operate as the electrically controlled continuously variable transmission such that the engine speed $N_E$ and the vehicle speed V, determined for the engine 8 to operate in the operating range at a high efficiency, match the vehicle speed and the rotational speed of the power transmitting member 18 determined with the gear position in the automatic transmission portion 20.

Figure 10:
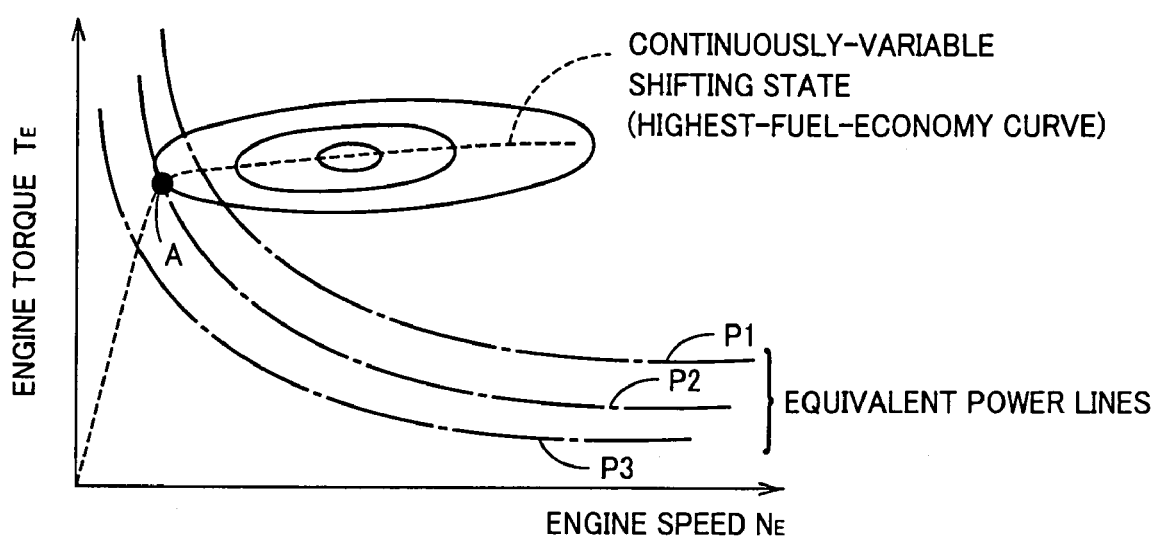
FIG. 10 is a view showing one example of a fuel economy map with a broken line indicating an optimum fuel economy curve of an engine.

That is, the hybrid control means 84 determines a target value of the total speed ratio γT of the transmission mechanism 10 such that the engine 8 is caused to operate along an optimal fuel efficiency curve (a fuel efficiency map and the relationships) of the engine 8 as indicated by a dotted line in FIG. 10 which is preliminarily and experimentally obtained and prestored. This achieves a compromise between drivability and fuel consumption during the running of the vehicle under a continuously variable shifting mode on a two-dimensional coordinate established with the engine speed $N_E$ and output torque (engine torque) $T_E$ of the engine 8. For instance, the target value of the total speed ratio γT of the transmission mechanism 10 is determined so as to obtain engine torque $T_E$ and the engine speed $N_E$ for generating the engine output demanded for satisfying target outputs (a total target output and demanded drive torque). Then, the speed ratio γ0 of the differential portion 11 is controlled in consideration of the gear position in the automatic transmission portion 20 so as to obtain the relevant target value, thereby controlling the total speed ratio γT within a continuously variable shifting range.

When this takes place, the hybrid control means 84 allows electric energy, generated by the first electric motor M1, to be supplied through an inverter 54 to a battery device 56 and the second electric motor M2. Thus, a major part of drive power of the engine 8 is mechanically transferred to the power transmitting member 18. However, a part of drive power of the engine 8 is consumed with the first electric motor M1 for the generation of electric power and converted into electric energy. Resulting electric energy is supplied through the inverter 54 into the second electric motor M2, which is consequently driven. Therefore, the part of drive power is transferred through the second electric motor M2 to the power transmitting member 18. Equipment, involved in the operations starting from the step of generating electric power to the step of causing the second electric motor M2 to consume resultant electric energy, establishes an electric path which converts the part of the drive power of the engine 8 into electric energy and resultant electric energy is converted into mechanical energy.

Particularly, if the step-variable shift control means 82 executes a shifting control of the automatic shifting portion 20, the automatic shifting portion 20 varies the speed ratio step-by-step. This allows the shifting mechanism 10 to have a total speed ratio γT that can be varied step-by-step on a stage before and after the shifting. With the total speed ratio γT varied step-by-step, i.e. with the speed ratio varied in a discontinuous manner but in a skipped state, drive torque can be more rapidly varied than that achieved when the total speed ratio γT is continuously varied. In contrast, it is likely that a shifting shock occurs with a risk of a difficulty encountered in controlling the engine rotation speed $N_E$ in line with an optimum fuel economy curve with accompanying deterioration in fuel consumption.

To address such an issue, the hybrid control means 84 allows the differential portion 11 to execute the shifting. In this moment, the speed ratio is caused to vary in a direction opposite to a direction in which the speed ratio varies in synchronism with the shifting of the automatic shifting portion 20. This minimizes stepwise variation in the total speed ratio γT. In other words, the hybrid control means 84 executes the shifting control of the differential portion 11 In synchronism with the shifting control of the automatic shifting portion 20. Thus, the shifting mechanism 10 has the total speed ratio γT that can continuously vary on the stage before and after the shifting of the automatic shifting portion 20.

For instance, the hybrid control means 84 establishes a given total speed ratio γT so as not to transiently vary the total speed ratio γT of the shifting mechanism 10 on the stage before and after the shifting of the automatic shifting portion 20. To this end, the hybrid control means 84 executes the shifting control of the differential portion 11 in synchronism with the shifting control of the automatic shifting portion 20. This allows the speed ratio to be varied step-by-step in a direction opposite to a varying direction of the speed ratio by a varying rate equivalent to step-by-step variation in speed ratio of the automatic shifting portion 20.

From another viewpoint, even with the automatic shifting portion 20 executed the shifting to cause step-by-step variation in speed ratio of the automatic shifting portion 20, the hybrid control means 84 controls the speed ratio γ0 of the differential mechanism 11 such that no variation takes place in operating point of the engine 8 on a stage before after the shifting. Curves P1, P2 and P3 shown in FIG. 10, indicate, for instance, examples of power lines P of the engine 8, respectively. The point A represents an example of the operating point of the engine 8, i.e. a driving state of the engine 8 defined in terms of the engine speed $N_E$ and engine torque $T_E$ determined based on a fuel economy efficiency (optimum fuel economy rate) of the engine 8.

The hybrid control means 84 executes a so-called power shifting on a stage before and after the shifting of the automatic shifting portion 20 for performing the shifting in the differential gear portion 11. This allows the operating point of the engine 8 to be placed on equivalent power lines with no variation taking place in the operating point of the engine 8 as indicated by a point A. That is, the operating point of the engine 8 is caused to trace the optimum fuel economy curve while permitting a power to be maintained. More particularly, the hybrid control means 84 executes a throttle control so as to allow engine torque $T_E$ to be kept nearly constant during the shifting of the automatic shifting portion 20. In addition, the hybrid control means 84 varies a first-motor rotation speed $N_{M1}$ in a direction opposite to that in which a second-motor rotation speed $N_{M2}$ varies with a progress in the shifting of the automatic shifting portion 20 so as to allow the engine rotation speed $N_E$ to be kept nearly constant.

The hybrid control means 84 allows the differential portion 11 to perform an electrically controlled CVT function for controlling, for instance, a first-electric-motor rotational speed $N_{M1}$ to maintain the engine speed $N_E$ at a nearly constant level or to control the rotational speed at an arbitrary level regardless of the vehicle remaining under a halted condition or a running condition. In other words, the hybrid control means 84 controls the first-electric-motor rotational speed $N_{M1}$ at an arbitrary level while maintaining the engine speed $N_E$ at the nearly constant level or the arbitrary rotational speed.

As will be apparent from the collinear chart shown in FIG. 3, for instance, when raising the engine speed $N_E$ during the running of the vehicle, the hybrid control means 84 raises the first-electric-motor rotational speed $N_{M1}$ while maintaining a second-electric-motor rotational speed $N_{M2}$ at a nearly fixed level that is bound with the vehicle speed V (represented by the drive wheels 34).

The hybrid control means 84 causes the throttle actuator 64 to controllably open or close the electronic throttle valve 62 for performing a throttle control. In addition, the hybrid control means 84 functionally includes engine output control means that outputs commands to an engine output control device 58 singly or in combination. This causes a fuel injection device 66 to control a fuel injection quantity and a fuel injection timing for fuel injection control while causing an ignition device 68 to control an ignition timing of an ignition device 68 such as an igniter or the like for an ignition timing control. Upon receipt of such commands, the engine output control device 58 executes an output control of the engine 8 so as to provide a demanded engine output.

For instance, the hybrid control means 84 basically drives the throttle actuator 64 in response to the accelerator opening Acc by referring to the prestored relationship (not shown). The throttle control is executed such that the greater the accelerator opening Acc, the larger will be the throttle valve opening $\theta_{TH}$. Upon receipt of the commands from the hybrid control means 84, further, the engine output control device 58 allows the throttle actuator 64 to controllably open or close the electronic throttle valve 62 for throttle control while controlling the ignition timing of the ignition device 68 such as the igniter or the like for ignition timing control, thereby executing an engine torque control.

Further, the hybrid control means 84 is operative to cause the differential portion 11 to perform the electrically controlled CVT function (differential action) to achieve the motor drive mode regardless of the engine 8 remaining under the halted condition or an idling state.

For instance, the hybrid control means 84 determines whether the vehicle remains in the motor-drive running region or the engine-drive running region based on the vehicle condition, represented by the actual vehicle speed V and a demanded or required output torque, by referring to a relationship (drive-power-source switching lines and drive-power-source map) shown in FIG. 8 for thereby executing either a motor-drive running mode or an engine-drive running mode. The relationship, shown in FIG. 8, has boundary lines, prestored as parameters involving the vehicle speed V and the demanded output torque $T_{OUT}$, between the motor-drive running region and the engine-drive running region for switching a running drive-power source between the engine 8 and the second electric motor M2.

The drive-power-source map A, shown by a solid line in FIG. 8, is prestored together with a shifting map represented by, for instance, solid lines and single dot lines in FIG. 8. As will be apparent from FIG. 8, the hybrid control means 84 executes the motor-drive running mode in a relatively low output torque range $T_{OUT}$, regarded to be generally lower in engine efficiency than that of the engine operating in a high output torque range, i.e., a low load range.

In order to suppress a drag of the engine 8 being halted for improving fuel consumption during such a motor-drive running mode, the hybrid control means 84 controls the first-electric-motor rotational speed $N_{M1}$ in a negative rotational speed to render, for instance, the first electric motor operative under an unloaded condition, thereby achieving an idling state. By so doing, the engine speed $N_E$ is zeroed or nearly zeroed depending on needs due to the electrically controlled CVT function (differential action) of the differential portion 11.

Even if the engine-drive running region is present, the hybrid control means 84 allows the first electric motor M1 and/or the battery device 56 to supply electric energy to the second electric motor M2 using the electrical path mentioned above. This drives the second electric motor M2 to apply torque to the drive wheels 34, capable of providing a so-called torque-assist for assisting drive power of the engine 8.

The hybrid control means 84 renders the first electric motor M1 operative under the unloaded condition to freely rotate in the idling state. This makes it possible to cause the differential portion 11 to interrupt a torque transfer; i.e., the differential portion 11 is rendered inoperative with no output being provided under the same state as that in which the power transmitting path is disconnected in the differential portion 11. That is, the hybrid control means 84 places the first electric motor M1 in the unloaded condition, capable of placing the differential portion 11 in a neutral condition (neutral state) in which the power transmitting path is electrically disconnected.

With the drive-force source map as shown in FIG. 8, thus, a motor drive region is set to a relatively low output torque $T_{OUT}$ range, i.e. a low load range, which is generally regarded to cause lower engine efficiency than that achieved in a high torque range.

Turning back to FIG. 7, the output-shaft rotation sensor 100 detects a rotational direction and the revolution of the output shaft 22 of the shifting mechanism 10. To this end, the output-shaft rotation sensor 100 includes a rotary magnet plate, mounted on for instance the output shaft 22, which rotates the rotary magnet plate with the occurrence of magnetic fluctuations that are detected for detecting the rotational direction and the revolution of the output shaft 22. The vehicle speed and running-direction calculating means 102 calculates a running direction of the vehicle and the vehicle speed based on the rotational direction and the revolution of the output shaft 22 detected with the output-shaft rotation sensor 100.

More particularly, for instance, the rotational direction of the output shaft 22, i.e. either a clockwise rotation or a counter-clockwise rotation thereof, is preliminarily stored in correlation with the vehicle running direction, i.e. either a forward drive or a reverse drive. Based on such stored data, the vehicle running direction is determined, upon which the operation is executed to calculate a rotation speed of the output shaft 22 per given unit time. Then, a vehicle speed is calculated based on the resulting rotation speed of the shaft 22, a gear reduction ratio of a final reduction gear unit 32 and a radius of the drive wheel 34.

Further, the output-shaft rotation sensor 100 may be provided on another member such as, for instance, a drive shaft connected to the output shaft 22 for rotation at a certain ratio. In addition, a calculating method of the vehicle speed to be executed with the vehicle speed and running-direction calculating means 102 is suitably altered depending on a member for detecting the revolution of the output-shaft rotation sensor 100 so as to obtain a vehicle speed on a final stage.

Running-direction and shift-range comparing means 104 compares between the shift range set with the shift lever 50, and the vehicle running direction calculated with the vehicle speed and running-direction calculating means 102, upon which the resulting signal is output. More particularly, for instance, when the shift range is placed in either the forward drive range or the reverse drive range, the running-direction and shift-range comparing means 104 provides an output representing one of shift ranges. These shift ranges include (1) a shift range placed in the forward drive range with the vehicle running forward or remaining halted; (2) a shift range placed in the forward drive range with the vehicle running rearward or the running direction of the vehicle being unclear; (3) a shift range placed in the reverse drive range with the vehicle running rearward or remaining halted; and (4) a shift range placed in the reverse drive range with the vehicle running forward or the vehicle running direction being unclear.

The shifting-line altering means 92 alters a shifting line when the output, delivered from the running-direction and shift-range comparing means 104, indicates that the vehicle running direction simulated by the shift range is different from an actual running direction of the vehicle, or when the vehicle running direction is unclear. That is, when the shift range is placed in the forward drive range with the vehicle running forward or when the vehicle running direction is unclear, the shifting-line altering means 92 alters the shifting line that has been preset in line with the shift range. Further, in the illustrated embodiment, the reverse drive has only a single gear position in which no shifting is executed. Thus, even if the shift range is placed in the reverse drive range with the vehicle running forward, no shifting line is altered.

Figure 9:
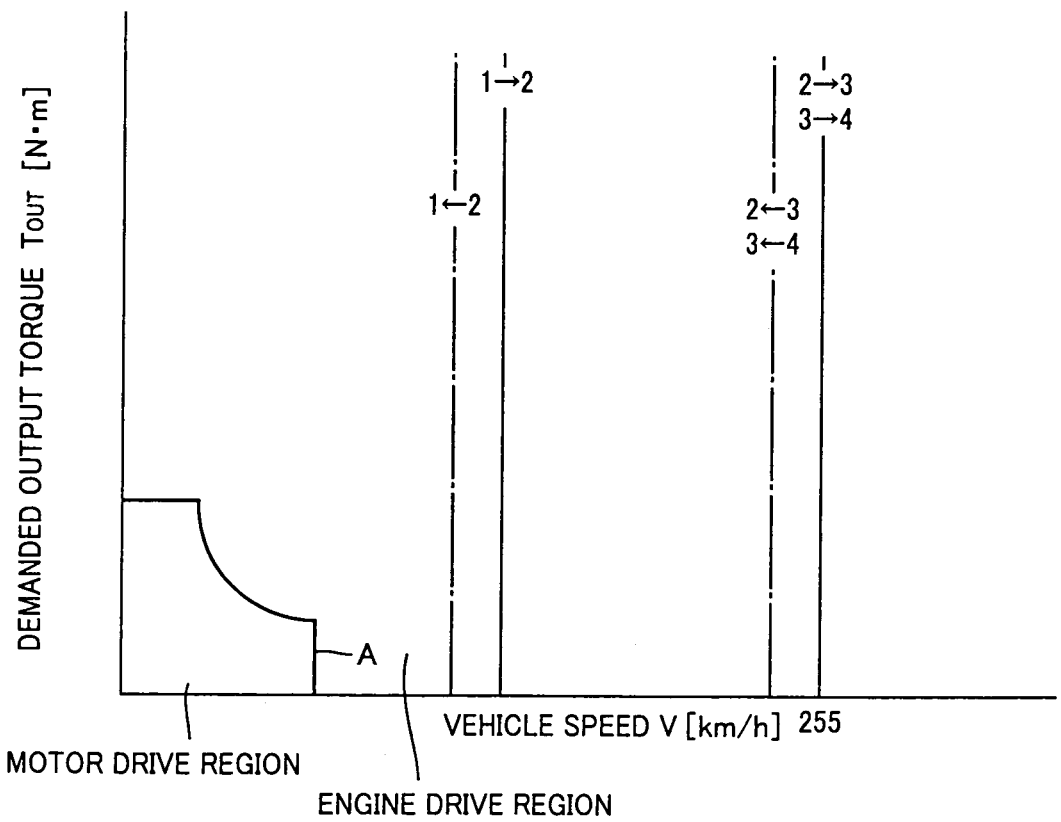
FIG. 9 is a view, representing one example of a shifting diagram for switched shifting lines switched by a shifting diagram switching means, which corresponds to the shifting diagram shown in FIG. 8.

In particular, when the shift range is placed in the forward drive range with the vehicle running rearward or the vehicle running direction being unclear, the shifting-line altering means 92 alters the shifting line, preset in line with, for instance, the shift range shown in FIG. 8, to another shifting line as shown in FIG. 9. That is; FIG. 9 shows one example of the shifting line diagram to be used in place of a preset shifting line when the shift range is placed in the forward drive range, with the vehicle running rearward or the vehicle running direction being unclear. Like FIG. 8, FIG. 9 shows the relationship (shifting line diagram and shifting map) having upshift lines (indicated in solid lines) and downshift lines (indicated by single dot lines). These shifting lines are preliminarily stored in terms of parameters including the vehicle speed V and the drive-force correlation value related to a drive force of the vehicle, i.e., for instance, demanded output torque $T_{OUT}$, thereby specifying a vehicle condition for the shifting to be executed.

As shown in FIG. 9, the automatic shifting portion 20 executes the shifting on both of an upshift line for a gearshift from a 2nd-speed gear position to a 3rd-speed gear position and another upshift line for a gearshift from the 3rd-speed gear position to a 4th-speed gear position which are determined, respectively. This shifting is executed so as to achieve both of the upshift from the 2nd-speed gear position to the 3rd-speed gear position, and the upshift from the 3rd-speed gear position to the 4th-speed gear position executed regardless of demanded output torque $T_{OUT}$ when the vehicle speed V marks a value of 255 (km/h).

To this end, two shifting lines are set in an overlapping relationship to be parallel to the longitudinal axis representing demanded output torque so as to intersect the horizontal line, representing the vehicle speed V, at the value of 255 (km/h) in FIG. 9. Further, the downshift lines are similarly specified and indicated by single dot lines in FIG. 9. To this end, two shifting lines for the downshift from the 4th-speed gear position to the 3rd -speed gear position and the downshift from the 3rd-speed gear position to the 2nd-speed gear position are set in an overlapping relationship to lie at points in a lower vehicle speed than that of the points at which the two upshift lines intersect by a hysteresis available to avoid the occurrence of a busy shifting.

The shifting is executed in the automatic shifting portion 20 to achieve the upshift from the 1st-speed gear position to the 2nd-speed gear position regardless of demanded output torque $T_{OUT}$. To this end, the shifting lines for the upshift from the 1st-speed gear position to the 2nd-speed gear position are set so as to intersect the horizontal axis of FIG. 9 such that the vehicle speed V, associated with the upshift lines for the upshift from the 2nd-speed gear position to the 3rd-speed gear position, lies at a position between 255 (km/h) and 0 (km/h). That is, the shifting lines, parallel to the longitudinal axis representing demanded output torque, are set in an overlapping relationship so as to intersect the horizontal axis, representing the vehicle speed, of FIG. 9 at a point between 255 (km/h) and 0 (km/h).

In addition, the downshift lines, indicated by single dot lines, are similarly specified such that the shifting line for the downshift from the 2nd-speed gear position to the 1st-speed gear position lies at a point in a lower vehicle speed than that of the upshift from the 1st-speed gear position to the 2nd-speed gear position by a hysteresis available to avoid the occurrence of a busy shifting.

The value of 255 (km/h) represents the vehicle speed, at which the shifting lines for the upshift from the 2nd-speed gear position to the 3rd-speed gear position and the upshift from the 3rd-speed gear position to the 4th-speed gear position, and one example of a vehicle speed that cannot be achieved in a normal running mode. Conversely, when executing the shifting by referring to the shifting diagram determined as shown in FIG. 9, the automatic shifting portion 20 uses only the 1st-speed and 2nd-speed gear positions. These gear positions represent gear positions in which no slippages are caused in other engaging devices due to locked states of the one-way clutches F1 and F2 even if the vehicle runs rearward. It can be said that in the illustrated embodiment, the shifting-line altering means 92 alters an upper limit of a selectable gear position, representing a gear position selectable in each forward drive range, to a 2nd-speed gear position while allocating a lower limit of the selectable gear position to be the 1st-speed gear position.

Further, the vehicle speed, at which the shifting line for the upshift from the 1st-speed gear position to the 2nd-speed gear position, is allocated to the value between 0 (km/h) and 255 (km/h). This value is set to a speed that prevents the input-shaft rotation speed of the automatic shifting portion 20 from overspeeding during the running of the vehicle with the gearshift effectuated in the 1st-speed gear position.

FIG. 11 is a flow chart illustrating an outline of control operations to be executed with the electronic control device 80 serving as a control device of the vehicular power transmitting apparatus according to the present invention. Steps (hereinafter the term "step" will be omitted) S1 and S2 collectively correspond to the running-direction and shift-range comparing means 104. Of these, at S1, a query is made as to whether a currently selected shift position or the gear shift rage is detected based on the output from the gearshift operation device 50, and whether the detected gear position or the shift range is placed for the forward drive. If the shift position or the shift range is placed for the forward drive, then a positive determination is made at present step and operations subsequent to S2 are executed.

Meanwhile, if the shift position or the shift range is not placed for the forward drive, i.e. when the gear position is placed for the reverse drive or when the gear position is placed for a neutral or halted position, then no need arises to switch a method of selecting the gear position in accordance with the present invention. Accordingly, a negative determination is made at the present step and S7 is executed.

At S2, a query is made as to whether the vehicle running direction is detected and the detected running direction is placed for the rearward drive or the running direction is unclear. The running direction of the vehicle is detected in calculation based on the rotational direction of the output shaft 22 of the vehicular power transmitting apparatus 10 detected with the output-shaft rotation sensor 100. If the vehicle running direction becomes unclear due to a determination made that the vehicle is under the reverse drive or a phase in which no running direction of the vehicle cannot be detected, a determination is made to be yes at the present step. In this moment, S3 is executed to switch the selecting method of the gear position in accordance with the present invention. On the contrary, if a determination is made that the vehicle is under the forward drive or remains halted, then a negative determination is made at the present step, and S4 is executed without switching the selecting method of the gear position in accordance with the present invention.

S3, corresponding to the shifting line altering means 92, represents step that is executed when the shift range for the forward drive is selected and the vehicle is under the reverse drive, or when the vehicle running direction is unclear. The shifting diagram, determining the gear position used in the running of the vehicle depending on a running condition of the vehicle, is altered from the shifting diagram for the normal forward drive as shown for instance in FIG. 8, to another shifting diagram as shown for instance in FIG. 9. FIG. 9 is the shifting diagram for preventing the locked state of the one-way clutches form causing slippages in other engaging devices even when the vehicle is running rearward.

At S4, the shifting diagram for the forward drive as shown, for instance, in FIG. 8 is used for making a shifting determination.

At S5, the operation is executed based on a current gear position of the automatic shifting portion 20 and a current running condition of the vehicle, i.e. demanded output torque $T_{OUT}$ and the vehicle speed V to query as to whether to execute the shifting. When this takes place, if S3 is executed before the current step (S5), then a shifting determination is made based on the shifting diagram altered at S3. If S4 is executed before the present step (S5), then another shifting determination is executed based on the shifting diagram used in S4. Subsequently, if the determination is made to execute the shifting, then a positive determination is made at present step and succeeding S6 is executed.

Meanwhile, if a determination is made that no shifting is needed, a negative determination is made at present step, upon which the control routine of the current flow chart is terminated. At S6 corresponding to the gear shift executing means 96, the operation is executed to perform the shifting determined at S5 for execution. In particular, both operations are executed at given timings to lower the engagement pressure of the engaging device to be disengaged in the shifting and increase the engagement pressure of the engaging device to be engaged in executing the shifting, thereby establishing the gear position subsequent to the executed shifting.

S7 represents step, executed when a negative determination is made at S1, at which the automatic shifting portion 20 establishes an engagement state in conformity to a gear position commanded with the gearshift operation device 50. More particularly, for instance, when the gearshift operation device commands the "N" position, all of the engagement devises are brought into disengaged states, respectively.

In the illustrated embodiment described above, the gear position of the automatic shifting portion 20 is switched depending on the shift position or the shift range selected with the gearshift operation device 50, and the vehicle running direction calculated with the vehicle speed and running-direction calculating means 102 (S2). Accordingly, even if the running directions, except for the shift position or the shift range and the vehicle running state, are placed in the same situations, a different gear position can be selected when the relationship concerning the shift position or the shift range and the vehicle running direction is different. This prevents the locked states of the one-way clutches F1 and F2 of the automatic shifting portion 20 from causing slippages in the other engaging devices (C1, C2, B1 and B2), thereby preventing a durability drop of the engaging devices.

With the embodiment set forth above, further, the gear position is selected in the automatic shifting portion 20 depending on the vehicle speed V representing the running condition of the vehicle. Consequently, by altering the vehicle speed available to perform the shifting depending on the selected shift position and the vehicle running direction, the selecting method of the gear position can be easily switched.

In the illustrated embodiment, furthermore, the gear position is selected in the automatic shifting portion 20 depending on the selected shift position or shift range. Therefore, altering the shift position or the shift range depending on the selected shift position or shift range and the vehicle running direction can easily switch the selecting method of the gear position.

With the embodiment set forth above, moreover, the gear position can be switched upon switching the shifting lines determined based on the selected shift position or shift range and the vehicle running direction. Accordingly, this can easily switch the method of selecting the gear position.

With the embodiment described above, further, the shifting line altering means 92 switches the gear position upon altering the upper limit or the lower limit of the selectable gear position. This can easily switch the selecting method of the gear position.

With the embodiment set forth above, furthermore, the selecting method of the gear position is altered based on the vehicle running direction and the selected shift position. The vehicle running direction is determined upon detecting the rotational direction of the output shaft 22 of the shifting mechanism 10 acting as the vehicular power transmitting apparatus, or a member such as the drive shaft connected to the output shaft.

With the embodiment set forth above, moreover, the shifting mechanism 10 acting as the vehicular power transmitting apparatus, includes the electrically controlled differential portion 11 rendered operative to control the differential state between the input-shaft rotation speed $N_{IN}$ and the output-shaft rotation speed $N_{18}$. This is accomplished by controlling the operating states of the electric motors (M1 and M2) connected to the rotary elements of the differential portion 11. Even with the vehicular power transmitting apparatus provided with such an electrically controlled differential portion 11, the locked states of the one-way clutches F1 and F2 can be prevented from causing slippages in the other engaging devices.

With the embodiment set forth above, besides, the shifting mechanism 10, acting as the vehicular power transmitting apparatus, has the power transmitting path in which both the automatic shifting portion 20 and the electrically controlled differential portion 11 are provided. The vehicular power transmitting apparatus includes the electrically controlled differential portion 11 and the automatic shifting portion 20 composed of the step-variable shifting portion having the one-way clutches. Even with such a structure, the locked states of the one-way clutches F1 and F2 is prevented from causing slippages in the other engaging devices.

With the embodiment set forth above, further, the mechanical shifting portion has the 1st-speed and 2nd-speed gear positions in which no slippages occur in the one-way clutches F1 and F2 when engaged. With such a structure, the shift position, selected with the gearshift operation device 50, is placed in the forward drive position and the vehicle running direction, calculated with the vehicle speed and running-direction calculating means 102 (S2), is placed in the reverse drive direction or unclear. In such a case, the automatic shifting portion 20 selects the 1st-speed gear position, during which if the vehicle runs rearward, the one-way clutches F1 and F2 are caused to freewheel i.e. to idly rotate. This prevents the locked states of the one-way clutches F1 and F2 from causing slippages in the other engaging devices.

With the embodiment set forth above, furthermore, the electrically controlled differential portion 11 is rendered operative to act as the continuously variable transmission upon controlling the operating states of the electric motors (M1 and M2). Therefore, even if the shifting mechanism 10, acting as the vehicular power transmitting apparatus, is rendered operative as the continuously variable transmission, the locked states of the one-way clutches F1 and F2 is prevented from causing slippages in the other engaging devices.

While the present invention has been described above with reference to the embodiment shown in the drawings, the present invention may be implemented in various other modes.

For instance, while the differential portion 11 operates as the continuously variable transmission, the present invention is not limited to such a configuration and the differential portion 11 may be configured to be operative as a step-variable transmission that can vary a plurality of fixed speed ratios.

In the above illustrated embodiment, the automatic shifting portion 20 has only one gear position for the reverse drive and the one-way clutch F1 is not associated with the gear position for the reverse drive. Therefore, no operation is executed to switch the method of selecting the gear position according to the present invention when the "R" range is selected (see S1 in FIG. 11).

However, the gear position for the reverse drive may be set to have, for instance, a plurality of gear positions a part of which has a gear position established upon engagement of a brake connected to the one-way clutch provided in parallel thereto. In this case, if the gear position is placed in the reverse drive position and the vehicle running direction is in the forward drive direction, the present invention may be applied to switch the selecting method of the gear position. Such an application provides a similar effect, i.e. an effect of preventing the locked states of the one-way clutches F1 and F2 from causing slippages in the other engaging devices.

In the above illustrated embodiment, further, while the vehicle running direction is calculated upon detecting the rotational direction of the output shaft 22 or the shaft connected thereto, the present invention is not limited thereto and may be. implemented in other method such as, for instance, a method of using an acceleration sensor.

In the above illustrated embodiment, furthermore, the gear positions have the 3rd-speed and 4th-speed gear positions that are operative to prevent the locked states of the one-way clutches F1 and F2 from causing slippages in the other engaging devices during the reverse drive mode. Therefore, by altering the upper limit of the selectable gear position to the 2nd-speed gear position, the gear position is switched with the selectable gear position having the lower limit kept in the 1st-speed gear position with no alteration made intact thereto.

However, the automatic shifting portion 20 may have, for instance, a 1st-speed gear position representing a gear position in which the locked states of the one-way clutches F1 and F2 cause slippages in the other engaging devices. In such a case, the automatic shifting portion 20 may have a 2nd-speed gear position at which a selectable gear position has a lower limit, with an accompanying similar result. That is, the gear position may be switched in the automatic shifting portion 20 upon setting only an upper limit or a lower limit of the selectable gear position or in combination of the upper and lower limits.

In the above illustrated embodiment, while the differential portion 11, having been described above as of the single planetary type, may be of a doubled-planetary type.

In the above illustrated embodiment, in the shifting mechanism 10 as the power transmitting apparatus, the engine 8, the differential portion 11 and the automatic shifting portion 20 are connected in series such that the power from the engine 8 as the power source is transmitted via the differential portion 11 to the automatic shifting portion 20. However, the shifting mechanism 10 can be constructed such that the power from the engine 8 is transmitted via the automatic shifting portion 20 to the differential portion 11.

In the above illustrated embodiment, in the shifting mechanism 10 as the power transmitting apparatus, the differential portion 11 and the automatic shifting portion 20 are connected in series. However, the present invention can be applied to the power transmitting apparatus as long as it has a function to achieve an electrically controlled differential action enabling a differential state to be electrically varied and a function to perform a shifting on a principle different therefrom. There is no need that the differential portion 11 and the automatic shifting portion 20 are mechanically independent.

The present invention can be applied to a shifting mechanism in which two planetary gear sets are partially connected, and the internal combustion engine, the electric motor and the drive wheel are connected to each of the rotary elements of the planetary gear sets in the power transmissive state. Controlling the clutch and the brake connected to the rotary element of the planetary gear set switches the shifting mechanism to the step variable shifting state and the continuously variable shifting state.

In the above illustrated embodiment, in the shifting device 50 when the "M" position is selected as shifting position $P_{SH}$, each of the shifting ranges such as "4" range to the "1" range which are shiftable within the gear positions corresponding to each of the ranges. However, the gear positions can be selected such that the "4" position allows running only in the fourth gear position, and that the "3" position allows running only in the third gear position.

A shifting device other than the shifting device 50 shown in FIG. 6 can be employed. For example, the shifting device can be constructed to directly select the "4" range to the "1" range provided therein, instead for selecting "+" position or "−" position.

What is claimed is:

1. A control device for a vehicular power transmitting apparatus, wherein:
   the vehicular power transmitting apparatus comprises a plurality of engaging devices to establish a plurality of gear positions in combination of engaging operations of the plurality of engaging devices, at least one of the engaging devices including a one-way clutch; and
   the control device is operative to switch a gear position such that no slippages occur in the engaging devices except the one-way clutch due to engagement of the one-way clutch, depending on a selected shift position or shift range and depending on a vehicle running direction.

2. The control device for the vehicular power transmitting apparatus according to claim 1, wherein the control device selects the gear position depending on a vehicle speed.

3. The control device for the vehicular power transmitting apparatus according to claim 1, wherein the control device selects the gear position depending on the selected shift position or shift range.

4. The control device for the vehicular power transmitting apparatus according to claim 1, wherein the control device switches the gear position upon switching shifting lines.

5. The control device for the vehicular power transmitting apparatus according to claim 1, wherein the control device switches the gear position upon altering an upper limit or a lower limit of a selectable gear position.

6. The control device for the vehicular power transmitting apparatus according to claim 1, wherein the control device determines the vehicle running direction upon detecting a rotational direction of an output shaft of the vehicular power transmitting apparatus or a member connected to the output shaft.

7. The control device for the vehicular power transmitting apparatus according to claim 1, wherein the vehicular power transmitting apparatus includes an electrically controlled differential portion operative to control a differential state between an input-shaft rotation speed and an output-shaft rotation speed upon controlling an operating state of an electric motor connected to a rotary element of a differential portion.

8. The control device for the vehicular power transmitting apparatus according to claim 7, wherein the vehicular power transmitting apparatus includes a step-variable shifting portion and the electrically controlled differential portion both provided in a power transmitting path.

9. The control device for the vehicular power transmitting apparatus according to claim 8, wherein the step-variable shifting portion of the vehicular power transmitting apparatus has a gear position, causing no slippages to occur in the engaging devices except the one-way clutch due to the engagement of the one-way clutch, which is selected when the shift position or the shift range is in a forward drive position and the vehicle running direction is in a reverse drive direction or unclear.

10. The control device for the vehicular power transmitting apparatus according to claim 7, wherein the electrically controlled differential portion is rendered operative as a continuously variable shifting mechanism upon controlling an operating state of the electric motor.

11. The control device for the vehicular power transmitting apparatus according to claim 1, wherein the vehicular power transmitting apparatus includes a step-variable shifting portion and an electrically controlled differential portion both provided in a power transmitting path.

12. The control device for the vehicular power transmitting apparatus according to claim 11, wherein the step-variable shifting portion of the vehicular power transmitting apparatus has a gear position, causing no slippages to occur in the engaging devices except the one-way clutch due to the engagement of the one-way clutch, which is selected when the shift position or the shift range is in a forward drive position and the vehicle running direction is in a reverse drive direction or unclear.

13. The control device for the vehicular power transmitting apparatus according to claim 11, wherein the control device includes a step-variable shift control means for controlling the step-variable shifting portion, and a differential-portion control means for controlling the electrically controlled differential portion, the step-variable shift control means having gearshift determining means for determining whether to execute the shifting in the step-variable shifting portion to be shifted, and gearshift executing means for allowing the step-variable shifting portion to execute an automatic shifting control to establish the determined gear position.

14. The control device for the vehicular power transmitting apparatus according to claim 13, wherein the control device further includes running-direction and shift-range comparing means for comparing a shift range and a vehicle running direction, and shifting-line altering means for altering a shifting line when the output delivered from the running-direction and shift-range comparing means indicates that the vehicle running direction simulated is different from an actual running direction of the vehicle.

15. The control device for the vehicular power transmitting apparatus according to claim 1, wherein a step-variable shifting portion of the vehicular power transmitting apparatus has a gear position, causing no slippages to occur in the engaging devices except the one-way clutch due to the engagement of the one-way clutch, which is selected when the shift position or the shift range is in a forward drive position and the vehicle running direction is in a reverse drive direction or unclear.

* * * * *